(12) United States Patent
Tsai et al.

(10) Patent No.: US 11,904,589 B2
(45) Date of Patent: *Feb. 20, 2024

(54) SQUARE SYMMETRIC DOUBLE-DOUBLE LAMINATE STRUCTURES AND METHODS FOR MANUFACTURING AND USING THE SAME

(71) Applicant: The Board of Trustees of the Leland Stanford Junior University, Stanford, CA (US)

(72) Inventors: Stephen W. Tsai, Honolulu, HI (US); Dan Wang, Clementi (SG); Antonio Miravete, Tulare, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/864,505

(22) Filed: Jul. 14, 2022

(65) Prior Publication Data

US 2023/0015104 A1 Jan. 19, 2023

Related U.S. Application Data

(60) Provisional application No. 63/222,249, filed on Jul. 15, 2021.

(51) Int. Cl.
*B32B 7/027* (2019.01)
*B32B 38/18* (2006.01)
(Continued)

(52) U.S. Cl.
CPC .......... *B32B 38/1808* (2013.01); *B32B 7/022* (2019.01); *B32B 7/027* (2019.01);
(Continued)

(58) Field of Classification Search
CPC . A61K 38/00; A61P 1/04; A61P 35/00; B29C 70/30; B32B 2038/1891; B32B 2250/42; B32B 2250/44; B32B 2307/708; B32B 2309/06; B32B 2603/00; B32B 2605/00; B32B 2605/16; B32B 2605/18; B32B 38/1808; B32B 38/1833;
(Continued)

(56) References Cited

U.S. PATENT DOCUMENTS

2022/0297407 A1* 9/2022 Tsai .................... B32B 7/03

* cited by examiner

*Primary Examiner* — Lawrence D Ferguson
(74) *Attorney, Agent, or Firm* — Alston & Bird LLP

(57) ABSTRACT

Square symmetric composite laminate structures, and sub-modules thereof, are provided, along with methods of forming the same. The square symmetric laminate structures include two or more sub-laminate modules, each comprising: a first ply set consisting of a first ply layer oriented at a first angle and a second ply layer oriented at a second angle, a first sum of the first and second angles being ninety degrees; and a second ply set consisting of a third ply layer oriented at a third angle and a fourth ply layer oriented at a fourth angle, a second sum of the third and fourth angles being ninety degrees; wherein the second ply layer is positioned adjacent the third ply layer and the second and third ply layers are both positioned intermediate the first and fourth ply layers, thereby defining a double-double helix arrangement of the respective ply layers. Associated methods are also provided.

20 Claims, 18 Drawing Sheets

(51) Int. Cl.
*B32B 7/03* (2019.01)
*B32B 7/022* (2019.01)
(52) U.S. Cl.
CPC ............ *B32B 7/03* (2019.01); *B32B 38/1833* (2013.01); *B32B 2038/1891* (2013.01); *B32B 2250/42* (2013.01); *B32B 2250/44* (2013.01); *B32B 2307/708* (2013.01); *B32B 2309/06* (2013.01); *B32B 2605/00* (2013.01)
(58) Field of Classification Search
CPC ........... B32B 7/022; B32B 7/027; B32B 7/03; C07K 14/5428; C07K 16/283; C07K 2317/31; C07K 2319/00; C07K 2319/30; C12Q 1/6827; C12Q 1/6869; C12Q 1/6883; C12Q 1/6886; C12Q 2600/106; C12Q 2600/156; G01N 2333/5428; G01N 2333/57; G01N 2800/065; G01N 33/6866; G01N 33/6869; G16B 25/10; G16B 30/00
See application file for complete search history.

| Aji° \ Double-Double Field [2w] | 0 | 10 | 20 | 30 | 40 | 50 | 60 | 70 | 80 | 90 |
|---|---|---|---|---|---|---|---|---|---|---|
| 0  | 0.885 | 0.861 | 0.796 | 0.708 | 0.618 | 0.546 | 0.500 | 0.477 | 0.470 | 0.469 |
| 10 | 0.861 | 0.837 | 0.772 | 0.684 | 0.594 | 0.522 | 0.476 | 0.453 | 0.446 | 0.445 |
| 20 | 0.796 | 0.772 | 0.707 | 0.618 | 0.529 | 0.457 | 0.410 | 0.388 | 0.381 | 0.380 |
| 30 | 0.708 | 0.684 | 0.618 | 0.530 | 0.441 | 0.368 | 0.322 | 0.300 | 0.293 | 0.292 |
| 40 | 0.618 | 0.594 | 0.529 | 0.441 | 0.351 | 0.279 | 0.233 | 0.210 | 0.203 | 0.202 |
| 50 | 0.546 | 0.522 | 0.457 | 0.368 | 0.279 | 0.207 | 0.160 | 0.138 | 0.131 | 0.130 |
| 60 | 0.500 | 0.476 | 0.410 | 0.322 | 0.233 | 0.160 | 0.114 | 0.092 | 0.085 | 0.084 |
| 70 | 0.477 | 0.453 | 0.388 | 0.300 | 0.210 | 0.138 | 0.092 | 0.069 | 0.062 | 0.061 |
| 80 | 0.470 | 0.446 | 0.381 | 0.293 | 0.203 | 0.131 | 0.085 | 0.062 | 0.055 | 0.054 |
| 90 | 0.469 | 0.445 | 0.380 | 0.292 | 0.202 | 0.130 | 0.084 | 0.061 | 0.054 | 0.053 |

| φ (°) \ ψ (°) | 0 | 15 | 30 | 45 | 60 | 75 | 90 |
|---|---|---|---|---|---|---|---|
| 0 | 3.633 | 4.504 | 6.688 | 8.97 | 8.43 | 7.373 | 6.847 |
| 15 | 4.504 | 5.44 | 7.672 | 9.044 | 9.068 | 7.967 | 7.376 |
| 30 | 6.688 | 7.672 | 9.99 | 10.85 | 10.23 | 9.076 | 8.441 |
| 45 | 8.97 | 9.044 | 10.85 |  | 10.85 | 9.657 | 8.988 |
| 60 | 8.43 | 9.068 | 10.23 | 10.85 | 10.34 | 9.157 | 8.472 |
| 75 | 7.373 | 7.967 | 9.076 | 9.657 | 9.157 | 8.048 | 7.414 |
| 90 | 6.847 | 7.376 | 8.441 | 8.988 | 8.472 | 7.414 | 6.89 |

Θ = 45°

| φ (°) \ ψ (°) | 0 | 15 | 30 | 45 | 60 | 75 | 90 |
|---|---|---|---|---|---|---|---|
| 0 | 5.592 | 5.729 | 6.37 | 7.699 | 9.313 | 10.73 | 11.37 |
| 15 | 5.729 | 5.824 | 6.305 | 7.457 | 8.89 | 10.16 | 10.73 |
| 30 | 6.37 | 6.305 | 6.378 | 7.031 | 7.969 | 8.89 | 9.313 |
| 45 | 7.699 | 7.457 | 7.031 | 6.892 | 7.031 | 7.457 | 7.699 |
| 60 | 9.313 | 8.89 | 7.969 | 7.031 | 6.378 | 6.305 | 6.37 |
| 75 | 10.73 | 10.16 | 8.89 | 7.457 | 6.305 | 5.824 | 5.729 |
| 90 | 11.37 | 10.73 | 9.313 | 7.699 | 6.37 | 5.729 | 5.592 |

| φ (°) \ ψ (°) | 0 | 15 | 30 | 45 | 60 | 75 | 90 |
|---|---|---|---|---|---|---|---|
| 0 | 2.91 | 3.607 | 4.233 | 4.49 | 4.218 | 3.687 | 3.424 |
| 15 | 3.607 | 4.024 | 4.577 | 4.825 | 4.536 | 3.984 | 3.687 |
| 30 | 4.233 | 4.577 | 5.17 | 5.426 | 5.112 | 4.536 | 4.218 |
| 45 | 4.49 | 4.825 | 5.426 |  | 5.426 | 4.825 | 4.49 |
| 60 | 4.218 | 4.536 | 5.112 | 5.426 | 5.17 | 4.577 | 4.233 |
| 75 | 3.687 | 3.984 | 4.536 | 4.825 | 4.577 | 4.024 | 3.607 |
| 90 | 3.424 | 3.687 | 4.218 | 4.49 | 4.233 | 3.607 | 2.91 |

Θ = 45°

| φ (°) \ ψ (°) | 0 | 15 | 30 | 45 | 60 | 75 | 90 |
|---|---|---|---|---|---|---|---|
| 0 | 2.804 | 2.867 | 3.182 | 3.842 | 4.647 | 5.361 | 5.687 |
| 15 | 2.867 | 2.914 | 3.152 | 3.727 | 4.444 | 5.081 | 5.361 |
| 30 | 3.182 | 3.152 | 3.189 | 3.515 | 3.984 | 4.444 | 4.647 |
| 45 | 3.842 | 3.727 | 3.515 | 3.446 | 3.515 | 3.727 | 3.842 |
| 60 | 4.647 | 4.444 | 3.984 | 3.515 | 3.189 | 3.152 | 3.182 |
| 75 | 5.361 | 5.081 | 4.444 | 3.727 | 3.152 | 2.914 | 2.867 |
| 90 | 5.687 | 5.361 | 4.647 | 3.842 | 3.182 | 2.867 | 2.804 |

# SQUARE SYMMETRIC DOUBLE-DOUBLE LAMINATE STRUCTURES AND METHODS FOR MANUFACTURING AND USING THE SAME

CROSS REFERENCE TO RELATED APPLICATIONS

This application claims priority to and the benefit of U.S. Provisional Application No. 63/222,249, filed Jul. 15, 2021; the contents of which as are hereby incorporated by reference in their entirety.

BACKGROUND

Technical Field

The present invention relates generally to certain applications of composite laminates and/or utilization of the composite laminates formed from double-double laminate configurations and constructed with square symmetric characteristics.

Description of Related Art

Conventional composite laminate structures were generally designed to emulate the strength characteristics of conventional metal-based laminate materials and as such are constrained to designs having layers of plies that are both symmetrical and balanced. Such conventional structures, when so constrained and containing at least four distinct ply layers formed from black carbon fibers, were commonly referred to in the art as "black aluminum" due to their combined carbon makeup and metal-emulating characteristics. Additional details surrounding conventional composite laminate structures may be understood with reference to US Publication No. 2006/0093802, the contents of which as are hereby incorporated herein by reference in their entirety.

These conventional composite laminate structures oftentimes utilized "legacy quad laminates" (as commonly referred to), which involve laminates made of collections of [0], [+45], [−45], and [90] plies (see e.g., legacy quad field 1, illustrated in FIG. 1A and detailed elsewhere herein). When one each of the three layers is stacked, the resulting structure is quasi-isotropic because it matches the isotropic properties of aluminum, which informs one of the reasons for calling such composite laminate black aluminum. The legacy quad laminates were always discrete in nature, meaning a limited number of ply angles and/or ply angle combinations (of multiple layers of the four discrete plies, as listed above) could be chosen. To have desired directional properties, more plies than the quasi-isotropic made of four plies had to be added, leading to 6, 8, 10 or more plies of sub-laminates (as detailed elsewhere herein). When laminates are made with mid-plane symmetry, resulting total laminates have doubled thickness of 12, 16, and 20 plies. If thicker laminates are needed, multiples of 12, 16, and 20 had to be considered. In extreme cases, laminates are selected based on total laminate without use of sub-laminates. In such cases, the total laminate may be selected based on the percentages of 0°, ±45° and 90° with plies dispersed across the thickness. Only explicit requirements in such cases are mid-plane symmetry, and a limit of three on-ply orientation groupings (i.e., no more identical ply groupings can be stacked together).

The above is a unique issue with the legacy quad family of laminates. First, the sub-laminates are thick, secondly, mid-plane symmetry is required, and, lastly, huge jump in laminate thickness as thick sub-laminates are added. The huge jump can be mitigated by adding some chosen plies not part of the repeated sub-laminates. But such arbitrarily added plies, in thickness less than 6, 8, or 10 plies, differ from the properties of the sub-laminates and make optimization practically impossible. There is also an issue on minimum gauge. Many components and devices require laminate thickness less than 12, 16, and 20 plies. The use of legacy quad composites is thus not feasible in those contexts, such as for example in the realm of fuselage or wing skins. Sub-laminates of this nature were also delamination prone, and multiple failure modes resulting from thousands of fiber discontinuities and matrix cracking. Complex procedures to blend adjacent laminates with different stacking and thickness, and to drop or add plies are required for a complex structure and impede optimization and manufacturing.

With reference now to FIG. 1B, relative to the 10-ply legacy quad field 1 illustrated in FIG. 1A, populated therein also are the discrete sub-laminates achievable (indicated by the discrete dots or anchors shown) with not only a 10-ply sub-laminate, but also with associated 6-ply and 8-ply configurations (i.e., a combined 10-, 8-, and 6-ply configuration 5). Thus, it may be understood that—even with the 6-, 8-, and 10-ply conventional legacy quad sub-laminate structures—a total field of only forty-seven (47) laminates was achievable (see again, FIG. 1B; see also FIG. 3B). Notably, though, holes remain visible between the respective discrete sub-laminate structures (i.e., although some of the dots or anchors 6 may partially overlap one another, not all of the dots or anchors 6 fully overlap with each other and thus fill all of the visible space in the field); as a result, achieving certain desirable material characteristics remains challenging and many times simply unachievable (again, due to the various self-inflicted constraints on conventional legacy quad field sub-laminates having different thicknesses in 6 to 10-plies that make blending and ply drop so complicated).

Inefficiencies arose in conventional composite laminate structures due to their discrete nature, exacerbated by self-inflicted constraints in the industry, including a perceived requirement that all composite laminate structures—and in particular the sub-laminate structures therein—have conventionally-defined balanced and symmetric material characteristics; stated otherwise, they involve necessarily thick sub-laminate structures and mid-plane symmetry. Specifically, mid-plane symmetric laminates involve a reflective or mirror-image equivalence of ply orientation about their mid-plane, while balanced laminates involve an equal number of positively (+) and negatively (−) oriented plies across their entirety. Such constraints have historically largely remained unchallenged due to concerns that conventional composite laminated structures will undesirably warp upon cool down from a curing temperature or increased residual stress when the operating temperature changes. For example, to enforce symmetry, a minimum number of plies must be doubled leading to 12, 16, and 20 plies, or higher multiples like 24, 32 and 40, and beyond. Additional details surrounding conventionally imposed constraints may be understood with reference to U.S. Pat. No. 9,296,174, the contents of which as are hereby incorporated herein by reference in their entirety.

Mid-plane symmetric laminates have been traditionally formed by stacking the multiple layers of various unidirectional plies in such a manner that the composite laminate exhibits a mirror-image of itself about a mid-plane of the structure. Such lamination processes are generally time and labor intensive as well as being prone to error, requiring special attention to ensure precision ordering of the respective composite layers and may result in an unnecessary number of plies, which may contribute to excessive process waste and cost. Still further mid-plane symmetric laminates have historically proven cumbersome when seeking to taper the exterior surface of a structure, due at least in part to the desire to maintain symmetry throughout, even when dropping ply layers to form the taper. In addition, as the individual or a pair of mid-plane symmetric plies with substantially the same orientation is dropped to form a taper, the laminate stacking sequence and thus the material's strength characteristics, are altered.

Although not problematic on their own, balanced laminates, like conventional mid-plane symmetric ones described above, have been traditionally formed by stacking multiple layers of various unidirectional plies at a plurality of precise orientations with relatively large angles between them. For example, each off-axis ply, such as a +45° ply is typically matched (e.g., mirrored) by a −45° ply. In addition, a common practice was to have four-ply orientations incorporating angles of −45°, 0°, +45°, and 90° (i.e., the [0], [±45] and [90] configuration mentioned previously herein, simply using an alternative nomenclature). Three-ply orientations were also common, such as 0°, ±45° configurations; yet critical was that the number of positive (+) and negative (−) oriented plies remain equal.

Balanced and mid-plane symmetric laminates of this nature have also traditionally created difficulty when trying to minimize laminate and even sub-laminate thickness, requiring ever thinner plies as the only option to offset the need to add 6-, 8- or 10-ply (or even more plies such as being doubled when symmetry is required) to achieve desirable material characteristics. Tapering (i.e., ply drop) complexities have also existed in these structures as well, with one exemplary limitation being that dropping of specific plies or groups thereof must not disturb the desired symmetry and balance. As a result, due to the discrete nature of available ply angles (influenced by both the extra thick sub-laminate structures and the symmetry constraints detailed herein), there were necessarily gaps between achievable laminate stiffness and/or strength characteristics that simply could not be bridged. Multiple failure modes, thousands of fiber discontinuities from ply drops and results from blending, and complexity in manufacturing were thus often faced due to self-inflicted constraints; stated otherwise, an optimal set of material characteristics in a laminate structure oftentimes had to be sacrificed to satisfy various self-imposed constraints; as a result, less than optimal laminate structures were used.

Improving upon conventional balanced and mid-plane symmetric laminates, a continuous double-double sub-laminate structure was initially developed, as illustrated in FIGS. 2A-C. With reference now first to FIG. 2B, the number of laminates in each family of double-double depends on the angle increments. In the left-hand chart of tabular data, there are 100 laminates, from 0 to 90-degree plies and in 10-degree angle increments. The same increments are used in the table in FIG. 2A. Stated otherwise, in being continuous every value can be met; there are no holes. As may be understood, by comparison to FIG. 1B (illustrating the legacy quad laminate discrete members), many more options are provided and in a manner that provides a truly continuous field of variables from which to select for construction of any particular element for a structural component or the like.

In the right-hand chart of FIG. 2B, the tabular data also illustrates, from 0 to 90 degrees and in 2° increments, a further granular level of an achievable continuous double-double sub-laminate field 35. It should be understood that this field is achieved in substantially the same manner as the continuous field 30 described above and also illustrated in FIG. 2B, but for the degree of granularity in field 35 being at increments of 2° between each ply within the sub-laminate structure. The result, as illustrated, is a collection 35 (by way of non-limiting example) that includes 2,116 continuous laminates 36 that may all be utilized for forming a desired sub-laminate structure. Notably, a continuous field is provided, as compared with the limited set of discrete members provided in conventional configurations. For many devices high precision in stiffness may be required. They include acoustic and high frequency situations which often require such precision.

FIG. 2C further illustrates the manner in which the degree of granularity involved in forming each collection of continuous double-double sub-laminates was expansive, whereby here there is illustrated a continuous field 40 (see right-hand chart), produced with angle increments of 1°. This field results, as illustrated in the right-hand chart of FIG. 2C, in a double-double laminate field 40 that contains 8,281 sub-laminate structures from which to choose, each having distinctive material characteristics associated therewith. It should be understood that the illustrated angle increments in these figures (e.g., 10°, 2°, 1°) are non-limiting examples; in view of the derivative nature of the double-double sub-laminate field (as detailed elsewhere herein), any angle increment can be selected, depending upon the degree of resolution that may be necessary to obtain a viable stiffness or strength match (as also detailed elsewhere herein) to a conventional laminate structure and/or sub-laminate structure. In this manner, the double-double sub-laminate fields 30, 35, 40 should be understood as indicative of a continuous field of selectable ply angle and ply layer configurations, so as to best match conventional laminate structures having much greater thicknesses and/or to fill gaps of strength or stiffness values in such conventional structures due to the limited set of 47 discrete values under legacy quad-type configurations, as described previously herein.

Returning now to FIG. 2B, various advantages of the previously developed double-double field 30, 35 (depending on incremental degree chosen) may be understood. First, a continuous field of laminates [±Φ/±Ψ] (see FIG. 2C as well, illustrating the discrete and independent [±Φ] 42 and [±Ψ] 41 ply angle sets) is provided for selection therefrom, as contrasted with the discrete legacy quad collections (i.e., 47 options versus double double's 8,281+ potential options). Zooming to achieve higher resolution (i.e., granularity) is conceptually easy via various embodiments of the double-double sub-laminate described herein and is shown on the right side of FIG. 2B. Equally important with granularity and this continuous field is the advantage that the sub-laminate thickness remains constant, at most being 4-ply; 2- or 1-ply configurations. Stiffness values may thus be also changed in a continuous fashion (i.e., no holes or gaps), simply by changing the angles within the continuous field, as may be understood with reference to FIG. 2A. This makes optimization possible, blending by changing one helix at a time feasible (as described elsewhere herein), and out-of-plane homogenization more easily achieved (as also described elsewhere herein). All these features—not available from the legacy quad-type structures—via the various embodiments described herein are now achievable, leading to stronger, tougher, fewer failure modes, lighter, lower cost structure, not to mention lower minimum gage, with natural mid-plane symmetry, and feasible automated layup.

Referring now also to FIG. 2A, therein is illustrated a chart of stiffness values 25 for the previously developed double-double laminate structures, illustrating the continuous field provided thereby, dependent upon the ply angle values [±Φ/±Ψ] of the double-double sub-laminate. For example, a double-double sub-laminate having four total plies of [±Φ=20°/±Ψ=60] would have a stiffness value of 0.410. Stiffness values of each possible combination in the double-double sub-laminate field (see e.g., fields 30, 35, 40 of FIGS. 2B-C) are influenced (i.e., changed) by changing the angles of each pair of plies within each angle set (i.e., two sets within each sub-laminate, as will be detailed elsewhere herein). Notably, there within the previously developed structure 50% of each of ±Φ and ±Ψ. This provided a degree of simplicity, as compared to legacy quad members, where differing percentages of each angle must be utilized to alter stiffness values.

Additional details regarding the characteristics and advantages of the double-double sub-laminate field may be understood with reference to not only U.S. Pat. No. 9,296,174; but also U.S. Pat. No. 10,589,474; U.S. Publication No. 2021/0114336; and International Publication Nos. WO 2020/252126 and WO 2021/188783; cited as non-limiting examples of the applicant's previously developed technology.

Notwithstanding the advantages realized via the conventionally developed double-double sub-laminate field, various challenges remained. For example, in certain circumstances, having two sets of angle-ply would create added cost and/or retain some complexities considered undesirable in certain applications and/or for certain manufacturers. Likewise, variations and/or differences in thermal expansion and conductivity coefficients would lead to challenges with temperature management and/or control of thermal stress in constructed laminates or panels.

BRIEF SUMMARY

It will be shown that, utilizing square symmetric double-double laminate structures (including sub-modules), components can be constructed that further optimize various advantageous characteristics, achieving unforeseen advantages. These advantages include at least those listed hereinbelow.

One exemplary yet important advantage realized in square symmetric double-double laminate structures (including sub-modules thereof) is their uniqueness of having two normal stiffness components equal relative to one another, while the shear component remains independent thereof. This may be contrasted with conventional or quasi-isotropic laminate structures where the shear component is not an independent variable and orthotropic laminate structures with four independent component variables. Improved stiffness and manufacturing features are thus achieved via the square symmetric laminate structures described herein, wherein, as an example, shear coupling is zero in both orientations relative to a two-reference coordinate system. This is not achievable with other orthotropic laminate structures, as conventional in the industry.

Another exemplary advantage realized in square symmetric double-double laminate structures (including sub-modules thereof) is the stock or material required for manufacturers thereof. Specifically, only one angle-ply is required. Stated otherwise, square symmetric laminate structures are simply the cross-plied layups of a single angle-ply fabric. Thus, a manufacturer only needs to stock, by way of non-limiting example, stock [±30] angle-ply fabric, from which this alone a square symmetric laminate can be constructed as [±30/±60], with the [±60] layers being that originally at [±30] and rotated 90 degrees (i.e., cross-plied).

Yet another exemplary advantage realized in square symmetric double-double laminate structures (including sub-modules thereof) is that their thermal expansion coefficients remain constant for the entire family. Stated otherwise, there is only one thermal expansion, where alpha/x=alpha/y. Thus, if a desired structure is made of several square symmetric laminates, no thermal stress will exist amongst each of the respective square symmetric laminates (or sub-modules) forming the same; this is due to the equality of the thermal expansion coefficients. Such constructed laminates behave characteristically as if they are a single/same material. For spacecraft applications, where temperatures can vary widely, having equalized thermal expansion coefficients in this regard is oftentimes critical for the avoidance of thermal stress. This advantage is not realized for non-square symmetric versions of double-double laminate structures.

Various embodiments of the present invention are thus directed toward a sub-laminate module comprising: a first ply set consisting of a first ply layer oriented at a first angle and a second ply layer oriented at a second angle, a first sum of the first and second angles being ninety degrees; and a second ply set consisting of a third ply layer oriented at a third angle and a fourth ply layer oriented at a fourth angle, a second sum of the third and fourth angles being ninety degrees; wherein the second ply layer is positioned adjacent the third ply layer and the second and third ply layers are both positioned intermediate the first and fourth ply layers, thereby defining a double-double helix arrangement of the respective ply layers.

Various embodiments of the present invention are also directed toward a composite laminate structure comprising two or more sub-laminate modules, wherein in each of the two or more sub-laminate modules the first and second angles are different than the third and fourth angles, respectively; and the first, second, third, and fourth angles are each different across the two or more sub-laminate modules. Each sub-laminate module comprises: a first ply set consisting of a first ply layer oriented at a first angle and a second ply layer oriented at a second angle, a first sum of the first and second angles being ninety degrees; and a second ply set consisting of a third ply layer oriented at a third angle and a fourth ply layer oriented at a fourth angle, a second sum of the third and fourth angles being ninety degrees; wherein the second ply layer is positioned adjacent the third ply layer and the second and third ply layers are both positioned intermediate the first and fourth ply layers, thereby defining a double-double helix arrangement of the respective ply layers.

According to various embodiments, a wing skin is provided, comprising the composite laminate structure defined above. Other practical applied structures are also provided according to various embodiments.

Various embodiments of the present invention are still further directed toward a method of forming a composite laminate structure. The method involves the steps of: forming a first ply layer by dispensing a first set of first elongate tapes oriented in a first direction and a second set of second elongate tapes oriented in a second direction, a first sum of the first and second directions being 90 degrees, and forming a second ply layer by dispensing a third set of first elongate tapes oriented in a third direction and a fourth set of second elongate tapes oriented in a fourth direction, a second sum of the third and fourth directions being 90 degrees, wherein: the first and second directions are different than the third and fourth directions, respectively; the first ply layer has a layup of $[\Phi/(\pi/2-\Phi)]$ and the second ply layer has a layup of $[-\Psi/-(\pi/2-\Psi)]$; and the second elongate tape is positioned adjacent the third elongate tape and the second and third elongate tapes are both positioned intermediate the first and fourth elongate tapes, thereby defining a double-double helix arrangement of the respective elongate tapes forming the first and second ply layers.

BRIEF DESCRIPTION OF THE FIGURES

Brief reference will now be made to the accompanying drawings, which are not necessarily drawn to scale, and wherein:

FIG. 2A, representative of prior art, shows one master-ply stiffness component of all the sub-laminates within the double-double sub-laminate family;

FIGS. 5A-B show exemplary square symmetric layups in both original paired square symmetric angles and with those angles rotated 45 degrees;

FIGS. 11A-C illustrate buckling load characteristics of a laminated square panel according to various embodiments in both the original (0 degree) and rotated (45 degree) orientations;

FIG. 12A illustrates buckling load characteristics of a square panel constructed from square symmetric laminate after a 45-degree rotation thereof;

Figures 1A, 1B:
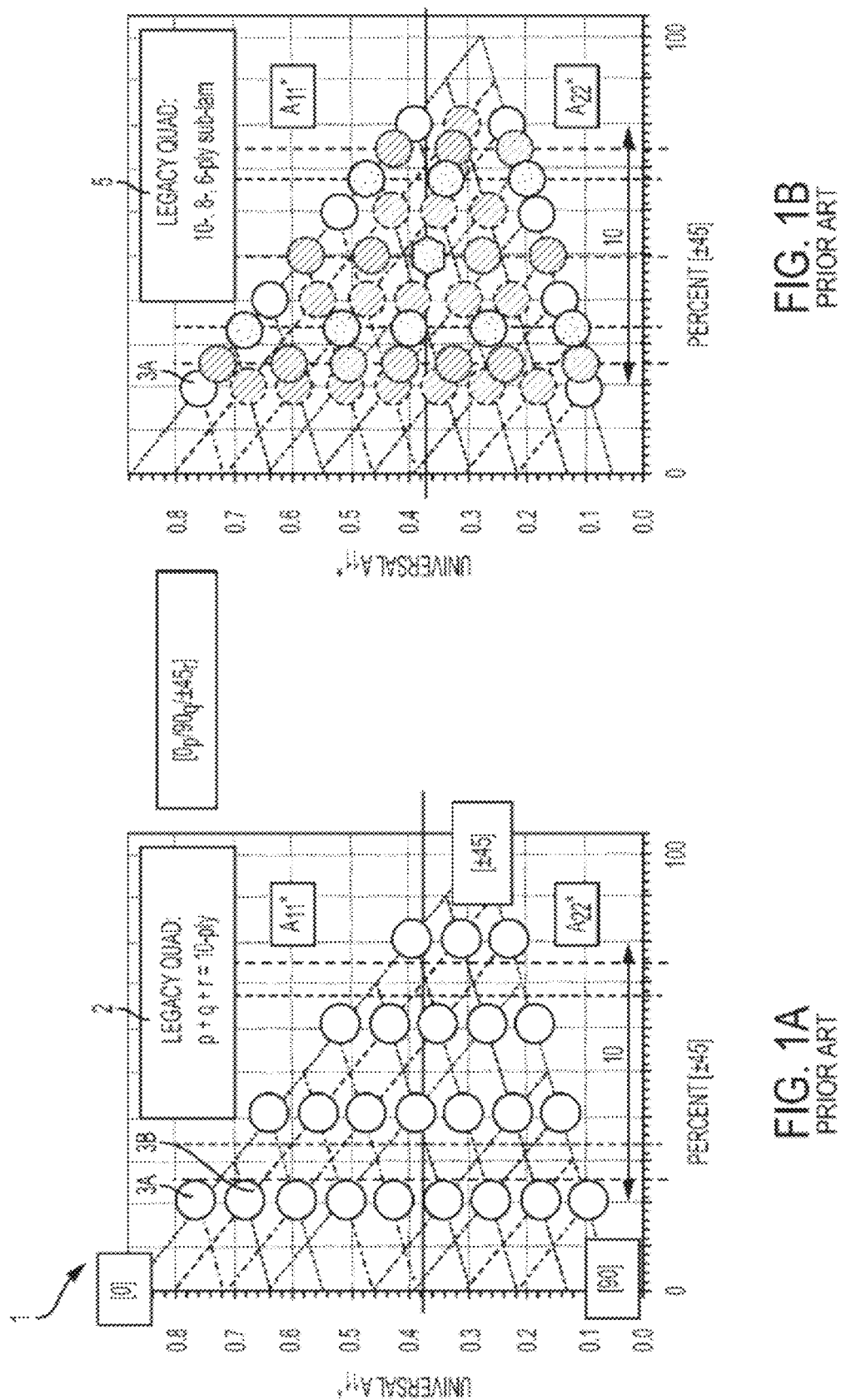
FIG. 1A, representative of prior art, shows a legacy quad conventional sub-laminate family, with focus upon a 10-ply configuration.
FIG. 1B, representative of prior art, shows the legacy quad conventional sub-laminate family of FIG. 1A, incorporating further 8- and 6-ply configurations alongside the 10-ply configuration.

Additional details regarding various features illustrated within the figures are described in further detail below.

DETAILED DESCRIPTION OF VARIOUS EMBODIMENTS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Terminology unique to the present invention and utilized throughout this disclosure is defined, in turn, below.

Double-double laminates: abbreviated as "DD," along with square symmetric laminates: abbreviated as "SS."

$n\pi$ repeat: the properties reserve the same with $n\pi$ repeat and n is an integer. For example, the layup is of $n\pi$ repeat since $[\theta]$ and $[\theta+n\pi]$ yield the same layup.

DD1: the first version of DD laminates, which corresponds to a sub-layup of $[\pm(\Phi+n\pi)/\pm(\Psi+m\pi)]$ with n and m are integers as $n\pi$ or $m\pi$ repeat or one of the staggered forms for different permutations, which is normally written as $[\pm\Phi/\pm\Psi]$ in short. Singe DD1: DD1 with $\Phi=\Psi$.

DD2: the second version of DD laminates, which corresponds to a sub-layup of $[\pm\phi]_{[\pm\psi]}$ or $[\pm\psi]_{[\pm\phi]}$ where the subscript means a helical pattern layup of a single-double, or just an angle-ply of $[\pm(\phi)]$ or $[\pm\psi]$, respectively. Two DD2 angles are calculated from DD1 as $[\pm\phi]=([\pm\Phi]+[\pm\Psi])/2$; $[\pm\psi]=([\pm\Phi]-[\pm\Psi])/2$, $n\pi$ repeat also works for each individual ply of DD2.

SS: corresponding to a sub laminate layup of $[\Phi/\Phi_{ss}/-\Psi/-\Psi_{ss}]$ with an expansion of $[\Phi/(\pi/2-\Phi)/-\Psi/-(\pi/2-\Psi)]$, or one of the staggered forms for different permutations, that the involved angles $[\Phi/\Phi_{ss}]$ and $[-\Psi/-\Psi_{ss}]$ can be added up to $\pm\pi/2$ in pairs. $n\pi$ repeat also works for each individual ply of SS.

DD3: the third version of DD laminates, which corresponds a layup formed of a 45 degree rigid body rotation from the SS layup of $[\Phi/\Phi_{ss}/-\Psi/-\Psi_{ss}]^{\{\pi/4\}}$, which leads to $[\pm(\Phi+\pi/4)/\pm(\Psi-\pi/4)]$ or one of the staggered forms for DD1. The subscript $\{\pi/4\}$ denotes the angle for rigid body rotation. $n\pi$ repeat also works for each individual ply of DD3. Single DD3: DD3 with $\Phi=\Psi$, which yield a sub laminate layup of $[\pm\Phi/\pm(\pi/2-\Phi)]^{\{\pi/4\}}$, or one of the staggered forms, corresponding to $[\pm(\Phi+\pi/4)/\pm(\Phi-\pi/4)]$ or one of the staggered forms for DD1, corresponding to a DD2 layup of $[\pm\pi/4]_{\pm\Phi}$. When $\Phi=\pi/4$, single DD3 yields $[\pm0/\pm\pi/2]$ with has the same normalized stiffness as $[0/\pi/2]_p$ with p as a positive integer denoting repeated layups.

SS-DD3: DD3 with $\Phi+\Psi=\pi/2$, which yield the same sub laminate layup as single DD3. SS-DD1: DD1 with $\Phi+\Psi=\pi/2$, which yield a sub laminate layup of $[\pm\Phi/\pm(\pi/2-\Phi)]$ or one of the staggered forms, corresponding to a DD2 layup of $[\pm\pi/4]_{\pm[\Phi-\pi/4]}$.

DD hybrid: including the case of a DD1-DD3 hybrid of $[[\Phi/\Phi_{ss}]^{\{\pi/4\}}/\pm\Psi]$, $[\pm\Phi/[-\Psi/-\Psi_{ss}]^{\{\pi/4\}}]$, and also the hybrid of $[0/\pi/2/\pm\Phi]$, $[0/\pi/2/[\Phi/\Phi_{ss}]^{\{\pi/4\}}]$ and $[0/\pi/2/[-\Psi/-\Psi_{ss}]^{\{\pi/4\}}]$ or one of the staggered forms for different permutations of these DD hybrid. nπ repeat also works for each individual ply of DD hybrid.

Conventional Laminate Characteristics

As mentioned previously herein, conventional legacy quad laminates were made of collections of [0], [±45] and [90] ply configurations. These laminates were discrete and not possible to interpolate due to a variety of self-inflicted constraints (e.g., fixed angles, symmetry, etc.). To have more directional properties, plies had to be added to their sub-laminates, which in turn increased weight and decreased design flexibility of laminate structures due to thickness. Nevertheless, to achieve somewhat desirable material characteristics of legacy laminates, necessarily at least 6-, 8- and 10-ply thick (and oftentimes thicker) sub-laminates were utilized. When laminates with mid-plane symmetry are required and met, their thicknesses with 6- to 10-ply sub-laminates would be doubled, tripled or more. Such thick sub-laminates were, in addition to being undesirably heavy in weight, delamination prone, which also made blending, ply drop, and ply layup difficult; still further material characteristics could oftentimes not be optimized (to, for example, desired characteristics) due to limitations imposed by the discrete number of ply configurations available in the field (see field 1 illustrated in FIG. 1A). As a result, there are gaps between laminate stiffness and strength that cannot be bridged using conventional legacy quad laminates. Multiple failure modes and complexity in manufacturing thus existed.

These various considerations involved with conventional legacy quad laminates may be understood with reference again to FIG. 1A, wherein the legacy quad field 1 for a 10-ply thick sub-laminate 2 is illustrated. Once more, conventional nomenclature is utilized as $[0_p/90_q/\pm45_r]$ to identify the sub-laminate, wherein p represents the number of 0° ply layers, q represents the number of 90° ply layers, and r represents the number of ±45° ply layers. In the specific example illustrated 10 total plies are provided. In example discrete sub-laminate 3A, the sub-laminate is formed with 80% 0° ply layers, 20%±45° ply layers and no 90° ply layers (i.e., for the 10-ply configuration illustrated, eight 0° ply layers, two ±45° ply layers and no 90° ply layers). Another discrete sub-laminate 3B is also highlighted, wherein the sub-laminate is formed with 70% 0° ply layers, 20%±45° ply layers and thus 10% 90° ply layers (i.e., for the 10-ply configuration illustrated, seven 0° ply layers, two ±45° ply layers and one 90° ply layers). As another non-limiting example, if stiffness with 80% 0°, 10% 90° ply and 10%±45° ply is desired, the sub-laminate will have to be 20 ply thick. Remaining characteristics for the other discrete twenty-four (24) sub-laminates available (i.e., each dot or anchor in FIG. 1A) may be extrapolated from these examples.

With reference now to FIG. 1B, relative to the 10-ply legacy quad field 1 illustrated in FIG. 1A, populated therein also are the discrete sub-laminates achievable (indicated by the discrete dots or anchors shown) with not only a 10-ply sub-laminate, but also with associated 6-ply and 8-ply configurations (i.e., a combined 10-, 8-, and 6-ply configuration 5). Thus, it may be understood that—even with the 6-, 8-, and 10-ply conventional legacy quad sub-laminate structures—a total field of only forty-seven (47) laminates was achievable (see again, FIG. 1B). Notably, though, holes remain visible between the respective discrete sub-laminate structures (i.e., although some of the dots or anchors 6 may partially overlap one another, not all of the dots or anchors 6 fully overlap with each other and thus fill all of the visible space in the field); as a result, achieving certain desirable material characteristics remains challenging and many times simply unachievable (again, due to the various self-inflicted constraints on conventional legacy quad field sub-laminates having different thicknesses in 6 to 10-plies that make blending and ply drop so complicated).

Figure 2B:
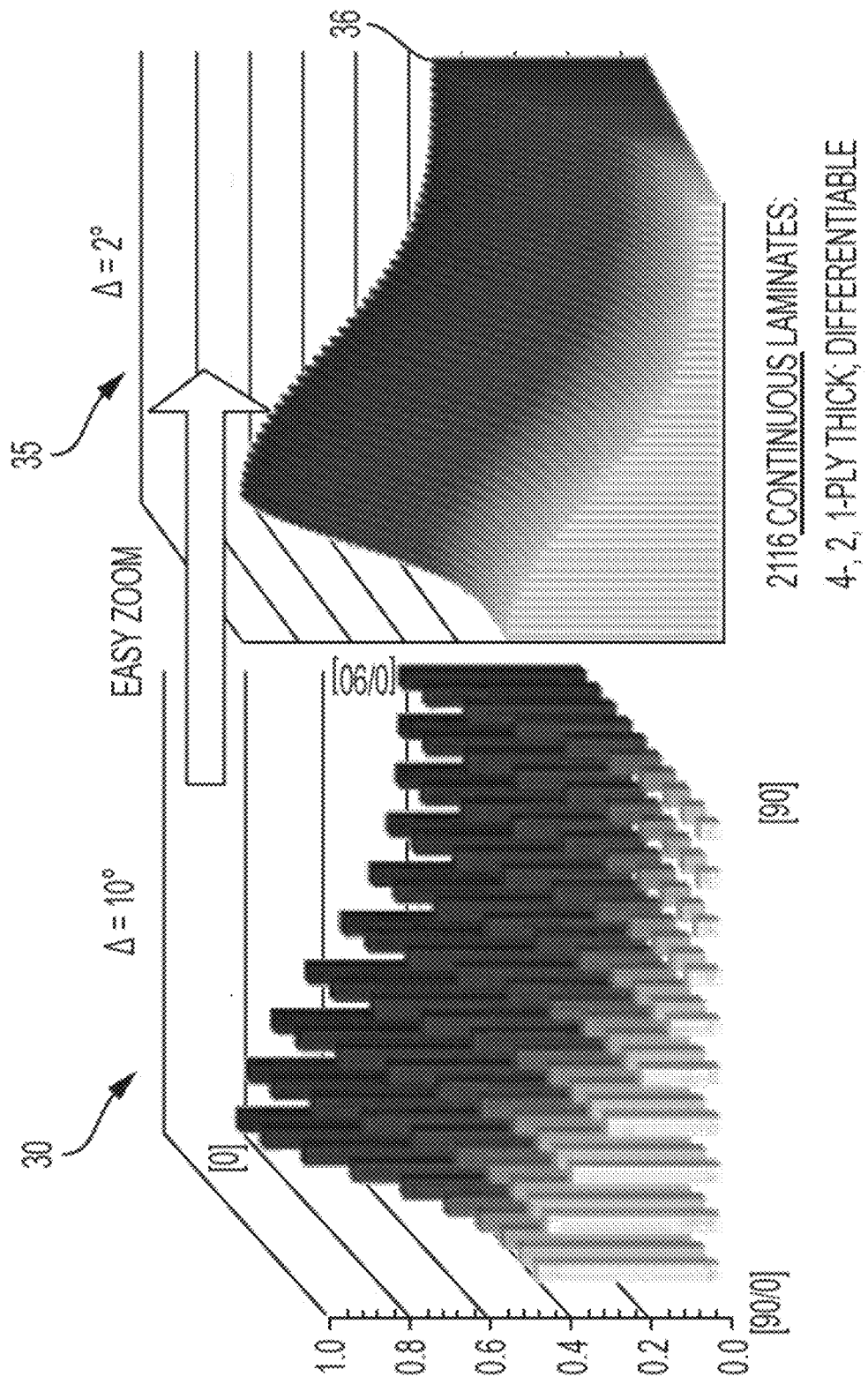
FIG. 2B, representative of prior art, shows two three-dimensional representations of the double-double sub-laminate family at angle increments of 10 and 2 degrees, respectively.
Figure 2C:
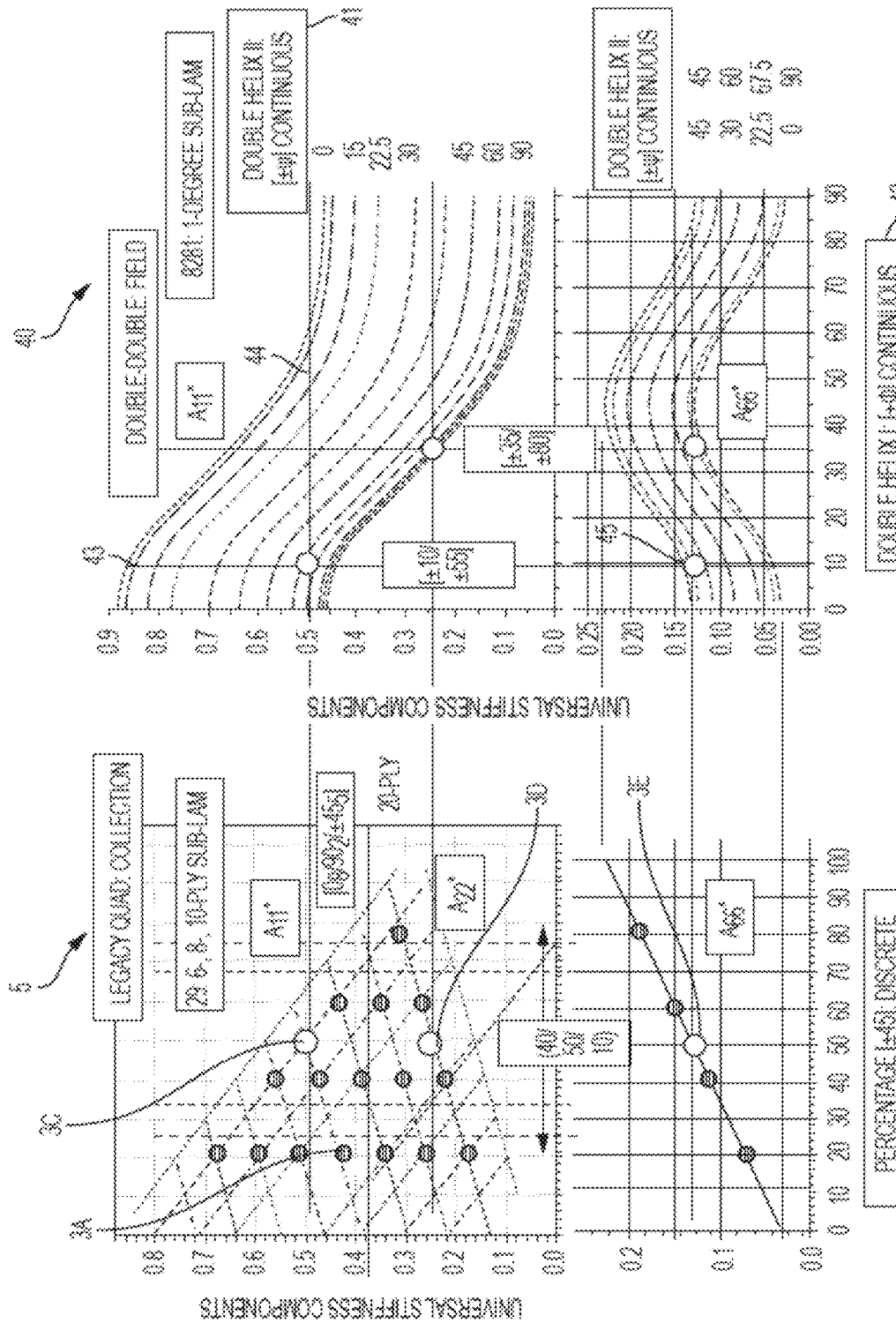
FIG. 2C, representative of prior art, shows aligned charts identifying viable replacements within the double-double sub-laminate field for anchors within the legacy quad sub-laminate field.

The collections of FIGS. 1A-B are also informative in terms of guidance of the laminate design without use of sub-laminates, as mentioned previously herein. As a non-limiting example, the entire laminate may be designed to satisfy the percentages of the quad ranges in 0°, ±45° and 90°. Beyond the requirements of symmetry and ply grouping to larger than three (again, as mentioned previously herein), every ply stacking selection is subjective, meaning there is no scientific or mathematical analysis involved, but for having well dispersed plies that would facilitate ply drop and blending. Unfortunately, this approach often leads to multiple internal fiber discontinuities, ply wrinkling, and other defects that can be sources of multiple damage initiation sites. Double-double laminates and sub-laminate structures, in contrast, achieve structures having no internal defects, due in part to the continuous field of options provided (see FIGS. 2A-C, as discussed elsewhere herein). In this context, having thin sub-laminates with constant thickness makes blending, ply drop, and manufacturing much simpler than the quad laminates in one piece or in thick sub-laminates; however, constraints and challenges have remained.

Notably, throughout the above discussion and illustrations it should be understood that one of the core problems of the legacy quad laminate design is that all sub-laminates are discrete. As a result, even with utilization of 6-, 8-, and 10-ply configurations, there are no comprehensive connections among all 47 members in the sub-laminate. Thus, beyond the remaining "holes" where certain material characteristics may remain unachievable, blending between different laminates (i.e., from adjoining elements) has no standard solution. This is because there is no continuous connection between the two different laminates, for example where each laminate is a different discrete configuration. There will be thousands of fiber discontinuities inside each laminate. They are the sources of multiple failures under static and fatigue loading. Tapering is also difficult due to the lack of continuity. As a result, laminated structures using legacy quad oftentimes cannot be optimized with respect to material characteristics, and ply stacking (including tapering and blending) is extremely complicated, making automated layup procedures not only costly, but also necessarily involving compromises in material characteristics and thus structural integrity, possibly leading to multiple material failure modes that are not possible to predict (at least in part due the complexities and uncertainties involved between the discrete dots or anchors).

Double-Double Laminate Characteristics

The continuous field of double-double sub-laminate structures described herein (see, as previously developed, with reference to FIGS. 2A-C described herein-above) achieves sub-laminates with at most 4-ply thick structures; even thinner 2- and 1-ply thick configurations are obtainable. Throughout various embodiments, the ply angles are also continuous, making blending of different laminates and their optimization achievable. Sub-laminate thickness remains constant. For directional property, the angles of each double helix can change continuously to the desired values. Plies are not added like the case of legacy quad family. As a result, far fewer failure modes (and virtually no unpredictable failure modes) are encountered, and automated layup procedures may be conducted in relative simplistic fashions. All of these and still other advantages lead to much simpler and lighter structures that are also better optimized for purposes of efficiency and accuracy, notably improvements given that the further above-detailed degree of uncertainty with conventional legacy quad laminate structures is becoming ever-increasingly unacceptable across multiple industries. Having thinner sub-laminates (4 of less versus 12 to 20) the minimum gage requirement is lowered. Many electronic and medical devices can now use composite laminate. This is not possible if laminates must be multiples of 12 to 20 plies.

Having double-double laminate structures was thus a game changer, providing a certain degree of flexibility, simplicity and efficiency of manufacture and layup, without sacrificing of certain material properties and/or characteristics. With reference to US Publication No. 2021/0114336 once more, it is noted that there were originally two versions of double-double (referred to elsewhere herein as "DD1" and "DD2"). These two classes are also referred to as $[\pm\Phi/\pm\Psi]$ (DD1) and one of $[\pm\Phi]_{[\pm\Psi]}$ or $[\pm\Psi]_{[\pm\Phi]}$ (collectively DD2), where the subscript means a helical pattern layup of a single-double, or just an angle-ply of $[\pm\Phi]$ or $[\pm\Psi]$, respectively. This relationship between the two original versions of double-double may be expressed as Equation 1 sets forth below:

$$[\pm\phi] = ([\pm\Phi] + [\pm\Psi])/2; = [\pm\psi] = ([\pm\Phi] - [\pm\Psi])/2 \qquad \text{Eq. 1}$$
$$[\pm\Phi] = ([\pm\phi] + [\pm\psi]); [\pm\Psi] = ([\pm\phi] - [\pm\psi])$$

According to various embodiments, DD1 may be laid along 1-axis with no cross-plying involved, while DD2 is laid in a helical pattern via either a tape winding machine or by an automated tape laying or fiber placement machine with an angle-ply or bi-angle tape. For example, a DD2 laminate structure may be $[\pm 60]_{[\pm 30]}$, which means a $[\pm 60]$ tape in a helical pattern of $[\pm 30]$, or its reciprocal of a $[\pm 30]$ tape in a helical pattern of $[\pm 60]$. Both are, in terms of material characteristics, the same DD2 laminate structure.

Figure 3:
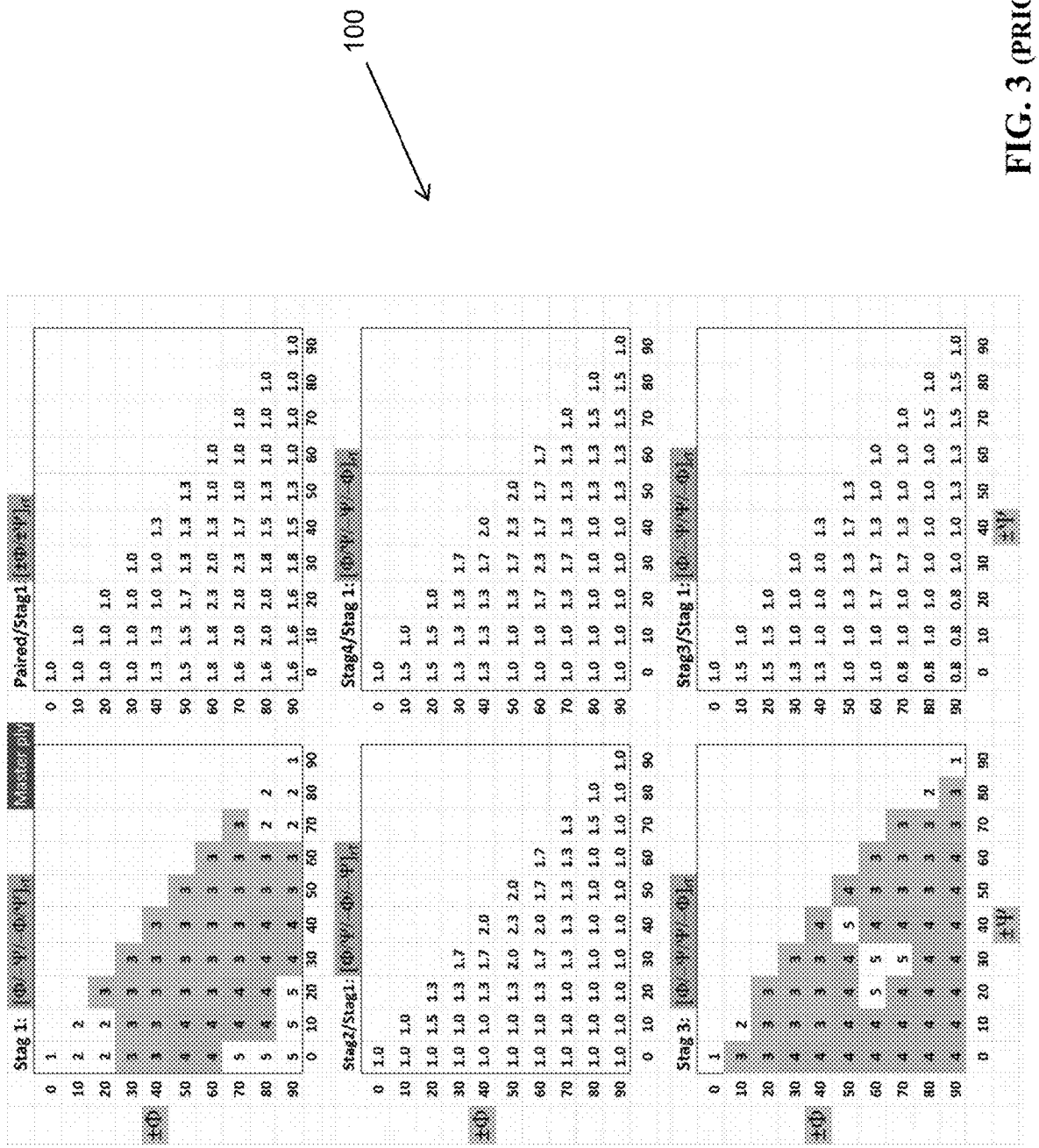
FIG. 3, representative of prior art, shows exemplary number of repeats for homogenization for different stacking sequences within the double-double sub-laminate field.

For double-double laminate structures, including both DD1 and DD2, there are conventionally five stacking sequence permutations, as illustrated in chart 100 of FIG. 3. These include paired $[\pm\Phi/\pm\Psi]$, Staggered 1 in $[\Phi/-\Psi/-\Phi/\Psi]$, Staggered 2 in $[\Phi/\Psi/-\Phi/-\Psi]$, Staggered 3 in $[\Phi/-\Psi/\Psi/-\Phi]$, and Staggered 4. In the upper left of FIG. 3, Staggered 1 provides the lowest number of repeats for optimization and thus, the best stacking efficiency for homogenization (where $[A^*]=[D^*]$, and $[B^*]$ vanishes). Staggered 3 is also illustrated in the lower left of FIG. 3, providing optimization as well, but less so than the Staggered 1 configuration. Simplified double-double laminates of this nature provide ease of design, along with flexibility and efficiencies for layups, tapering, weight savings, and the like. FIG. 3 illustrates further options as between the various staggered sequences of stacking DD1 and DD2, with some portions of chart 100 being represented by their repeats divided by the staggered 1 configuration. In these comparative charts, values are 1 (repeat equal to staggered 1 configuration) or higher.

Remaining with FIG. 3, it may be understood that only three or four repeats will be necessary for homogenization of either Staggered 1 or Staggered 3 sequenced double-double laminate structures. This sort of construction may be produced in two components, as follows: $[\Phi/-\Psi]$ or $[-\Phi/\Psi]$. So constructed, a Staggered 1 sequence may be laid up with the two parts or components stacked in alternating or succeeding layers. If one of the angles is less than 30 degrees, in certain embodiments it is desirable to provide a complementary angle (e.g., 90−25=65) as a rotated angle, so that any constructed sub-laminate or laminate composite structure will be limited in length in the transverse dimension (and thus minimize waste product).

For embodiments utilizing DD2, angle-ply continuous tape may be utilized, with an angle of more than 30 degrees. Depending on the particular layup machine utilized (see examples provided previously herein), a limit may be imposed on the helical angle for tape winding. In contrast, automated tape laying or tape placement machines may not require any helical angle limitations. Finished laminates construed in this fashion will be orthotropic (i.e., with no shear coupling). As with DD1 embodiments, orthotropic laminates constructed of DD2 are easier to design than those containing shear coupling; as compared to DD1, though, DD2 offers a further opportunity of keeping stock of tape/fabric to a minimum. For example, instead of having unique angles for each double-double construction, which most likely may not be re-usable for other applications, DD2 may be stocked simply in [±45] and [±30], practical for multiple applications with different desired helical angles associated therewith.

Any of the above-described paired or staggered sequences for layup, stacking, tapering, or the like may equally be utilized with the square symmetric laminate structures described in further detail herein-below.

Square Symmetric Double-Double Laminate Characteristics

Generally, it should be understood that square symmetric composite laminates under a 45° rigid body rotation (and the sub-modules contained therein, referred to elsewhere herein as "DD3") are another class of double-double (DD) laminate layup or sub-layup, whether in the paired or one of the staggered forms, as described herein-above. The symmetric composite laminate is a class of laminates that exists between isotropic and orthotropic materials. It is more general than isotropic material for having an independent shear modulus. It is simpler to design and manufacture than orthotropic material because it is controlled by single double, not double-double. Square symmetric laminates would have remained a lost child without the emergence of double-double. Suddenly unique features have been discovered that warrant serious consideration as a lamination option. The key considerations described in further detail below include: (1) Square symmetric double-double laminates have the layup of $[\pm(\Phi+45°)/\pm(\Phi-45°)]$ or $[\pm(\Phi/\pm(90°-\Phi)]$, which can be converted into each other using a 45° rigid body rotation and the feature that $\theta$ and $\theta\pm\pi$ yield the same layup for laminates; (2) Simple square symmetric double-double in having one angle: $[\pm\Phi/\pm(90°-\Phi)]$. Design would be simpler than full DD. Stocking of DD is reduced to one angle-ply; (3) There is only one stiffness components with $A_{11}^*+A_{66}^*=\frac{1}{2}$. Thus, only one single angle will be required. Optimization and scaling of the best laminate are simpler to do; (4) More rapid convergence to homogenization is achieved by having repeated square symmetric sub-laminates than regular double-double; (5) When a square symmetric laminate is rotated 45 degrees, shear coupling components $A_{16}$ and $A_{26}$ vanish. It is a unique way to make square symmetric laminate orthotropic and buckling behavior easier to control; and (6) Second-ranked tensors for the thermal expansion and conductivity components are constant for square symmetric laminates. They make thermal stress analysis simple.

This is a result of a 45-degree rigid body rotation from the square symmetric laminate with the involved angles added up to ±π/2 in pairs by using the feature that θ and θ±π yield the same layup. Stated otherwise, square symmetric laminate structure requires that the angles included, however sequenced, add up on parings thereof to ±π/2. As will be described further herein-below, when square symmetric laminates are rotated 45 degrees, its shear coupling components vanish, which may optimize skin construction with a grid as component sub-structures or the like.

An exemplary advantage of DD3, including the square symmetric double-double configuration, as described elsewhere herein, is its flexibility in layup. It offers another layup option that may be easier than DD1 and DD2 (as such terms are utilized and defined previously herein). As further exemplary advantages, a factory or manufacturing stocking an inventory containing only [±45°] tape/fabric, can achieve whatever the laminate is selected within the full range of the square symmetric double-double (see FIGS. 1-3), by utilizing DD3 or square symmetric configurations. Moreover, DD3 can be integrated with a grid as the sub-structure. Both straight and curved ribs can be produced with the use of braid or fishnet with knots that can easily be flattened by using either discontinuous inserts (to prop up the ribs) or enlarged volume around the joints. Multiple applications for fuselages, upper wing skins, lower wing skins, bulkheads, submarines, launch vehicles, or the like (each as described in further detail herein-below) may be achieved. Still further, as compared to DD1 and DD2, according to various embodiments of the square symmetric laminate configurations, a 45-degree rotated version is also provided, which significantly impacted stiffness, and in-plane shear coupling characteristics, as detailed further below.

Figure 4:
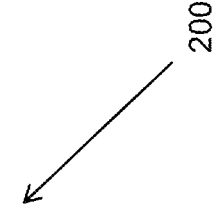
FIG. 4 shows normalized stiffness values of the double-double sub-laminate field, with original paired square symmetric laminates according to various embodiments highlighted.

Turning now to FIG. 4, illustrated in chart 200 thereof is the normalized stiffness of DD1 in various components, with engineering constants shown in percentages. All laminates in the illustrated family are orthotropic, where shear coupling components are zero, as evident in the two far-right tables specifically. When this illustrated family is homogenized (as described previously herein), its flexural stiffness is equal to in-plane stiffness, and both are orthotropic. Annotated (highlighted, with red text and orange background) throughout the tables of chart 200 of FIG. 4 are specific instances of square symmetric laminates within the broader double-double family. These laminates are further illustrated in the tables within chart 300 of FIG. 5A, along with the stiffness components thereof in the tables within chart 350 of FIG. 5B.

Returning to FIG. 4, it may be understood that there are four out of 29 orthotropic laminates with angle increments established at 15 degrees. So constrained, square symmetric laminates are bounded by [0°/90°] and [±45°]. In FIG. 4 specifically, two laminates in between are [±15°/±75°] and [±30°/±60°]. Quasi-isotropic laminate at [±32.5°/±67.5°] is not shown in this chart specifically, but it is the midpoint between the bounds of [0°/90°] at 47% and [±45°] at 11%. The average of (47+11)/2=37, the exact condition required for quasi-isotropy. The same is true for shear modulus, which is bounded by 3 and 23 with the average (3+23)/2=13, indicative of the shear modulus of quasi-isotropy.

When certain of the double-double laminates in FIG. 4 are rotated 45 degrees (see also FIG. 6, described herein-below), the resulting stiffness for each will have different stiffness components. One important feature of square symmetric double-double laminates according to various embodiments described herein is that shear coupling vanishes just as they did with 0, 45- and 90-degree orientations. Thus, the simplicity in design and manufacturing of orthotropic laminates (with vanishing shear coupling) is simpler than those with shear coupling in design, producibility, and thermal warpage.

Figures 5A, 5B:
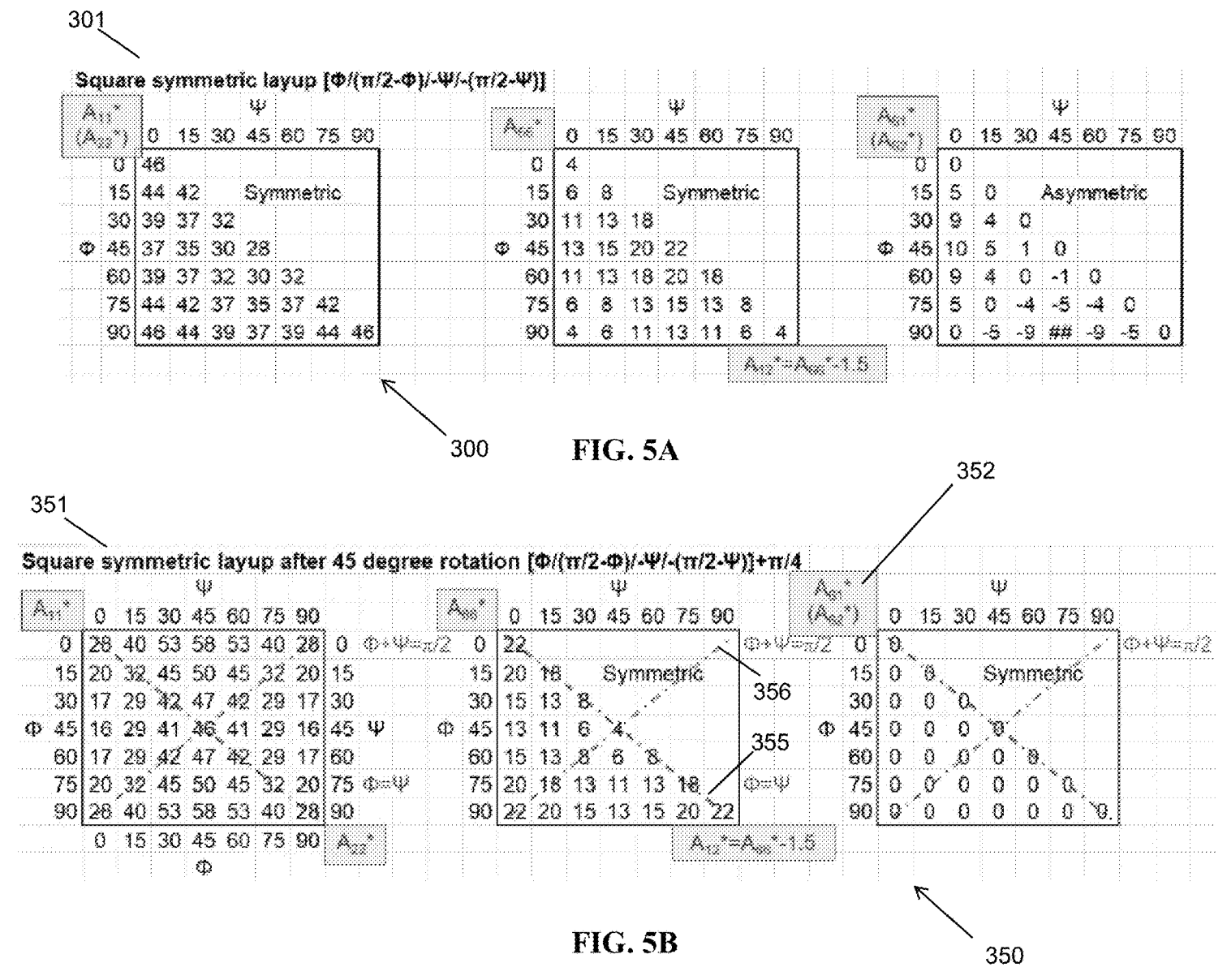

From chart 300 of FIG. 5A, the square symmetric layup of $[\Phi/(\pi/2-\Phi)/-\Psi/-(\pi/2-\Psi)]$ may be understood, whereby equal normal components in the 11 and 22 components are realized, ensured by the paired square symmetric angles with $\theta_1+\theta_2=\pi/2$. The proof in this regard is as shown below in Equation 2:

$$\begin{cases} A_{11} = \sum \left(Q_{11}^{(\theta_1)} + Q_{11}^{(\theta_2)}\right) = \sum (U_2(\cos 2\theta_1 + \cos 2\theta_2) + U_3(\cos 4\theta_1 + \cos 4\theta_2)) = \sum 2U_3\cos 4\theta_1 \\ A_{22} = \sum \left(Q_{22}^{(\theta_1)} + Q_{22}^{(\theta_2)}\right) = \sum (-U_2(\cos 2\theta_1 + \cos 2\theta_2) + U_3(\cos 4\theta_1 + \cos 4\theta_2)) = \sum 2U_3\cos 4\theta_1 \end{cases} \quad (2)$$

When specific instances of the square symmetric layup of $[\Phi/(\pi/2-\Phi)/-\Psi/-(\pi/2-\Psi)]$ 301 are rotated 45 degrees (see layup 351 in FIG. 5B), as in various embodiments of DD3 described herein, the resulting stiffness components are likewise evident in the tables of chart 350 of FIG. 5B. Lowest values, as evident from each of the tables within chart 350 lie on perpendicular and intersecting line 355, 356, where either $[\Phi=\Psi]$ or $[\Phi+\Psi=(\pi/2)]$. Exemplary optimized values decrease from $A_{11}^*$ to $A_{66}^*$, Still further and notably, as evident in the far-right table of chart 350 of FIG. 5B, the in-plane shear coupling 352, denoted by $A_{61}^*$ and $A_{62}^*$, is advantageously zero, with the following deduction derived from Equation 3 shown below:

$$\begin{cases} A_{61} = \sum_\theta (Q_{61}^{(\theta)}) = \sum_\theta \left(\frac{U_2}{2}\left(\sin 2\left(\theta+\frac{\pi}{4}\right) + \sin 2\left(\frac{\pi}{2}-\theta+\frac{\pi}{4}\right)\right) + U_3\left(\sin 2\left(\theta+\frac{\pi}{4}\right) + \sin 2\left(\frac{\pi}{2}-\theta+\frac{\pi}{4}\right)\right)\right) = 0 \\ A_{62} = \sum_\theta (Q_{62}^{(\theta)}) = \sum_\theta \left(\frac{U_2}{2}\left(\sin 2\left(\theta+\frac{\pi}{4}\right) + \sin 2\left(\frac{\pi}{2}-\theta+\frac{\pi}{4}\right)\right) - U_3\left(\sin 2\left(\theta+\frac{\pi}{4}\right) + \sin 2\left(\frac{\pi}{2}-\theta+\frac{\pi}{4}\right)\right)\right) = 0 \end{cases} \quad (3)$$

Figure 6:
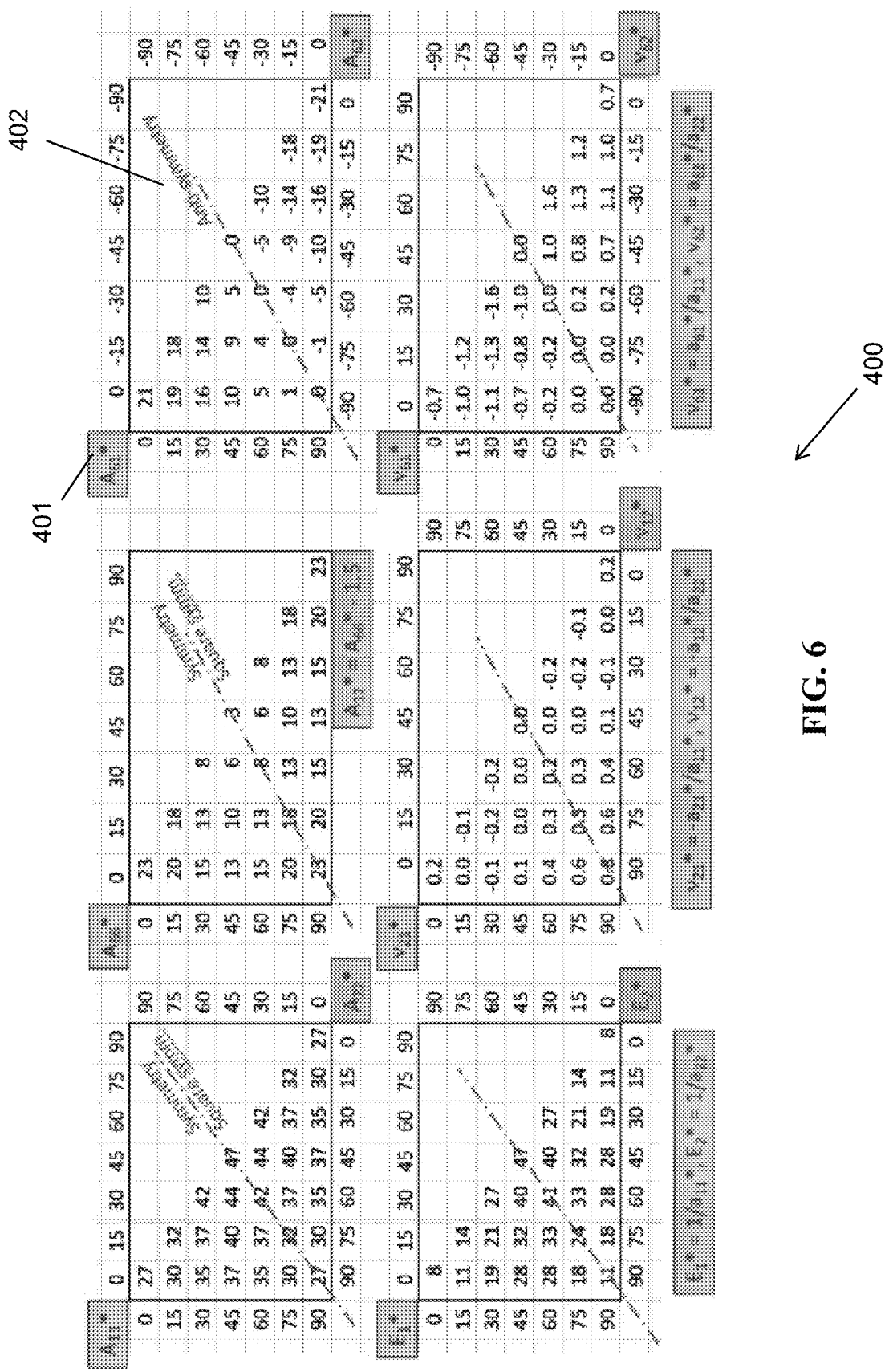
FIG. 6 shows normalized stiffness values of the double-double sub-laminate field as also illustrated in FIG. 4, but with the original paired square symmetric laminates rotated 45 degrees according to various embodiments.

This shear coupling optimization may also be understood with reference to the tables within chart 400 of FIG. 6, where when square symmetric laminates are rotated 45 degrees, shear coupling vanishes (as previously described herein). The upper right-hand table 401 is most informative, wherein along the symmetry line coupling components 402 are all zero. Similar optimized values appear in each of the remaining tables of chart 400 of FIG. 6; throughout paired angles are such that either $[\Phi=\Psi]$ or $[\Phi+\Psi=(\pi/2)]$. Configured in this manner according to various embodiments, square symmetric laminates (and sub-modules thereof) are the simplest laminate amongst all non-isotropic laminates. This is, at least in part, due to the rotational consistency that maintains shear coupling values set at zero. Stated otherwise, despite the rotation of the laminates, their stiffness components have the same values as those prior to rotation; only their positions are reversed, as evident by comparing FIG. 6 with FIG. 4.

Figure 7:
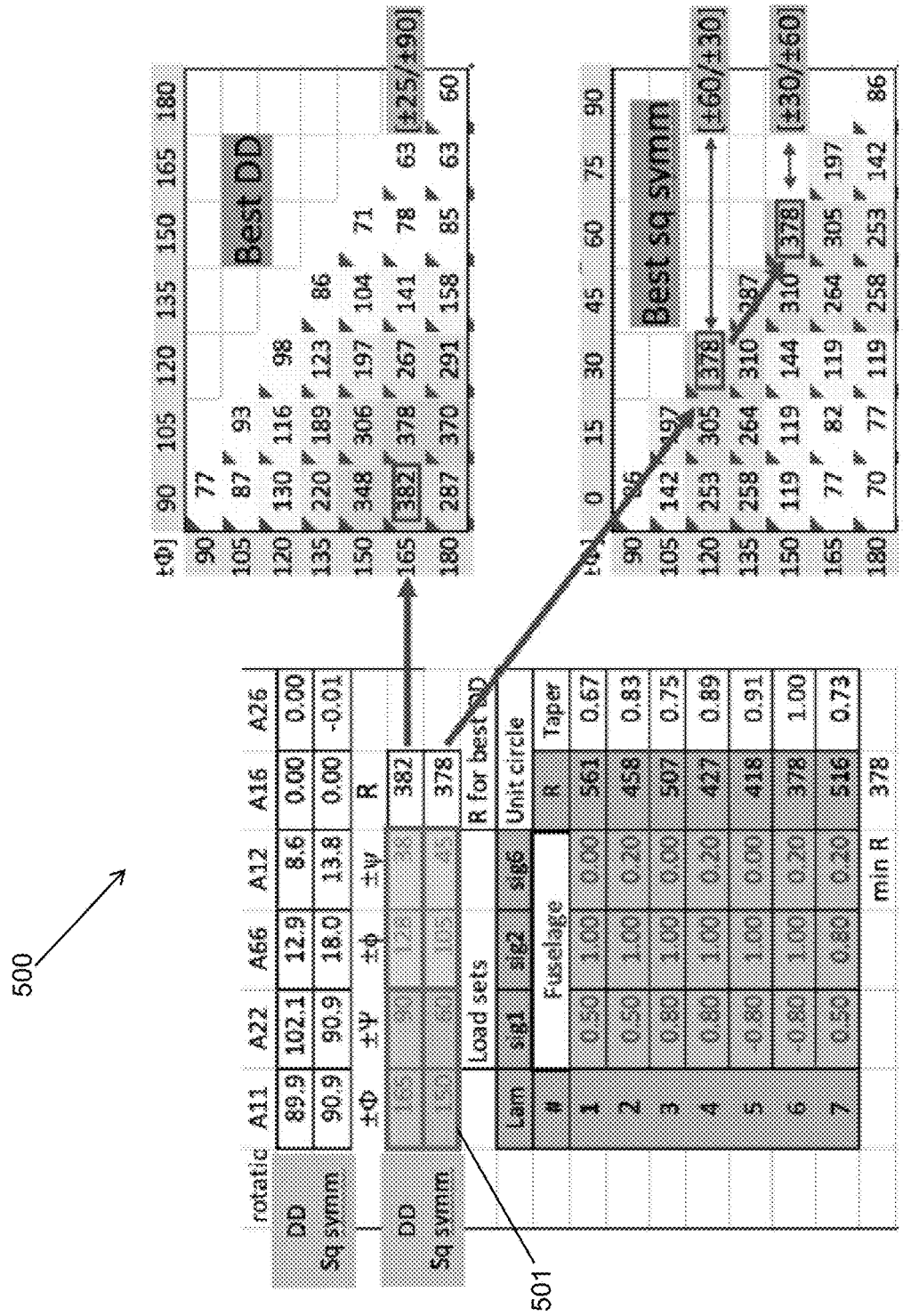
FIG. 7 illustrates two discrete laminate choices from the double-double sub-laminate field, compared with square symmetric laminate choices according to various embodiments.

Turning to FIG. 7, the expansion of laminate design options (i.e., the field) for double-double constructions by focus upon square symmetric configurations thereof may be further understood. With reference to the laminate search output 500 illustrated in FIG. 7, it may be seen how a manufacturer, or the like, may select various rotation values and compare resulting structural or material characteristics for square symmetric embodiments versus conventional double-double embodiments. As illustrated, two choices exist for each of double-double and square symmetric laminates (or sub-modules thereof). DD1, for example, specifies the two sets of angle plies as [±Φ/±Ψ]; while DD2 provides an alternative form of [±Φ]$_{[±Ψ]}$ or [±Ψ]$_{[±Φ]}$ (both as described previously herein).

Remaining with FIG. 7, the special case of square symmetric double-double laminates according to various embodiments is also illustrated, as [±Φ/±(π/2−Φ)]. Examples may thus be either [±60/±30] or [±60]$_{[±30]}$ however as desirable. Reference is made to the blue-rimmed box 501 of FIG. 7, illustrating all these optional forms for selection. Of note, single DD3 with [Φ=Ψ] or square symmetric (SS−) DD3 with [Φ+Ψ=(π/2)] will yield a sub-laminate composite layup of [±Φ/±(π/2−Φ)] utilizing either 45-degree rigid body rotation or one of the staggered forms, all as previously described herein. This result matches precisely, according to various embodiments, with the SS-DD1 of [±(Φ+π/4)/±(Φ−π/4)] of FIG. 6, understood best with reference to the dashed red lines annotated thereon.

Returning to FIG. 7, according to various embodiments, it is thus realized that regardless of DD3, SS-DD3, or SS-DD1 construction of a composite laminate structure (or sub-modules thereof), each leads to the same DD2 with the expression of [±π/4]$_{[±Φ]}$. As a result, the specific square symmetric subset of double-double, in certain embodiments described herein, only requires [±45] layers with a helical pattern layup of [±Φ]. This, amongst other various advantages detailed elsewhere herein, realizes reduced material and manufacturing costs. This realized zero shear coupling is provided in not only [±15/±75] and [±30/±60] (both evident in FIG. 7), but also in any square symmetric laminate where the two angles add up to ±(π/2) for two balanced ply layers. Zero shear coupling also exists in [0/90] and [±45] laminates, with the [0/90] embodiment being further simplified with equivalent layups of [±0/±90] and [0/90]$_2$, due to θ and θ±π yielding the same layup. Of note, [0/90]$_2$ can be used as an independent double-double sub-layup, or halved with a hybridization of another pair of balanced angles taking advantages of [0/90]$_n$, having the same normalized stiffness.

Figure 8A:
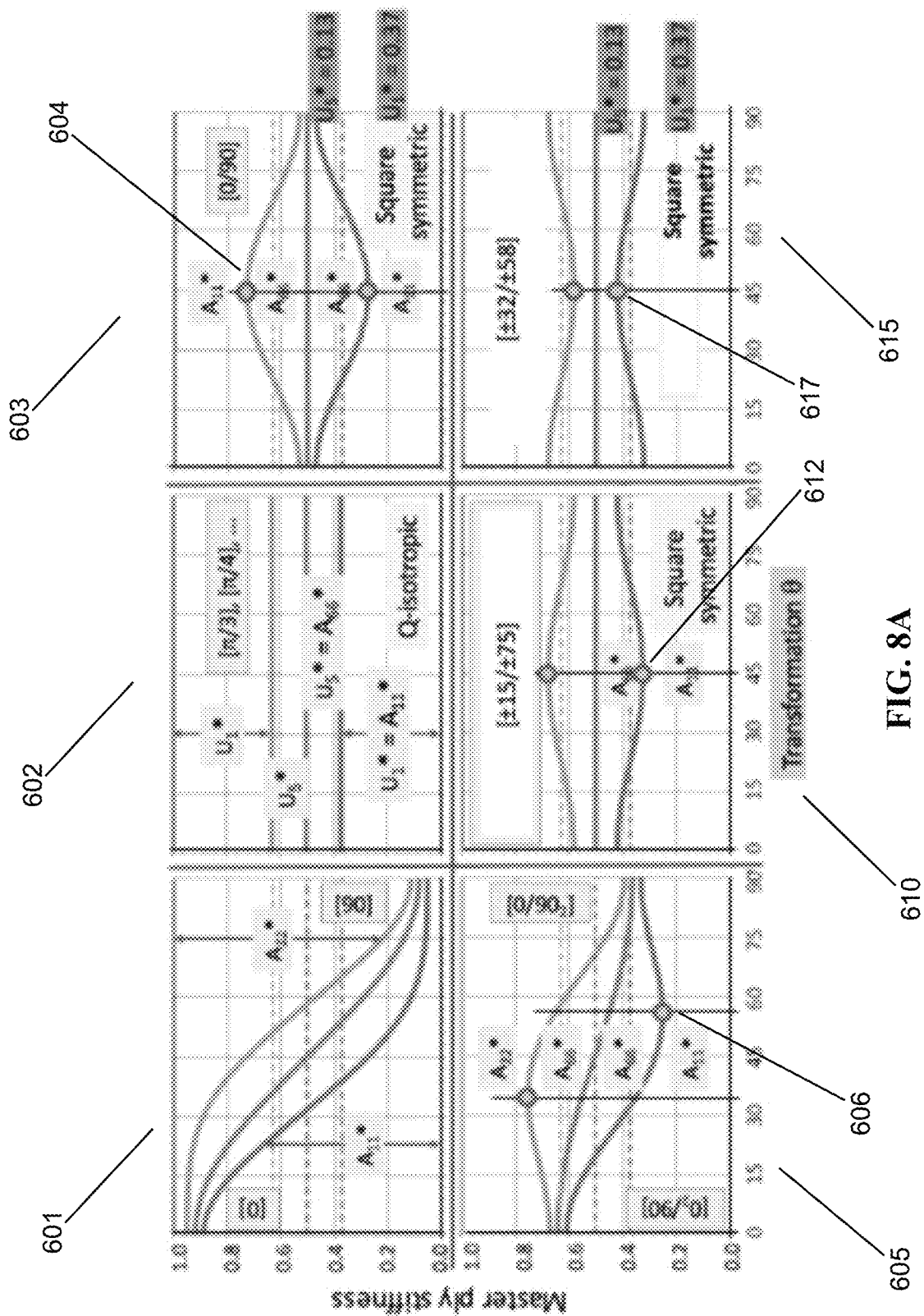
FIG. 8A illustrates transformation of laminates with and without square symmetry according to various embodiments.
Figure 8B:
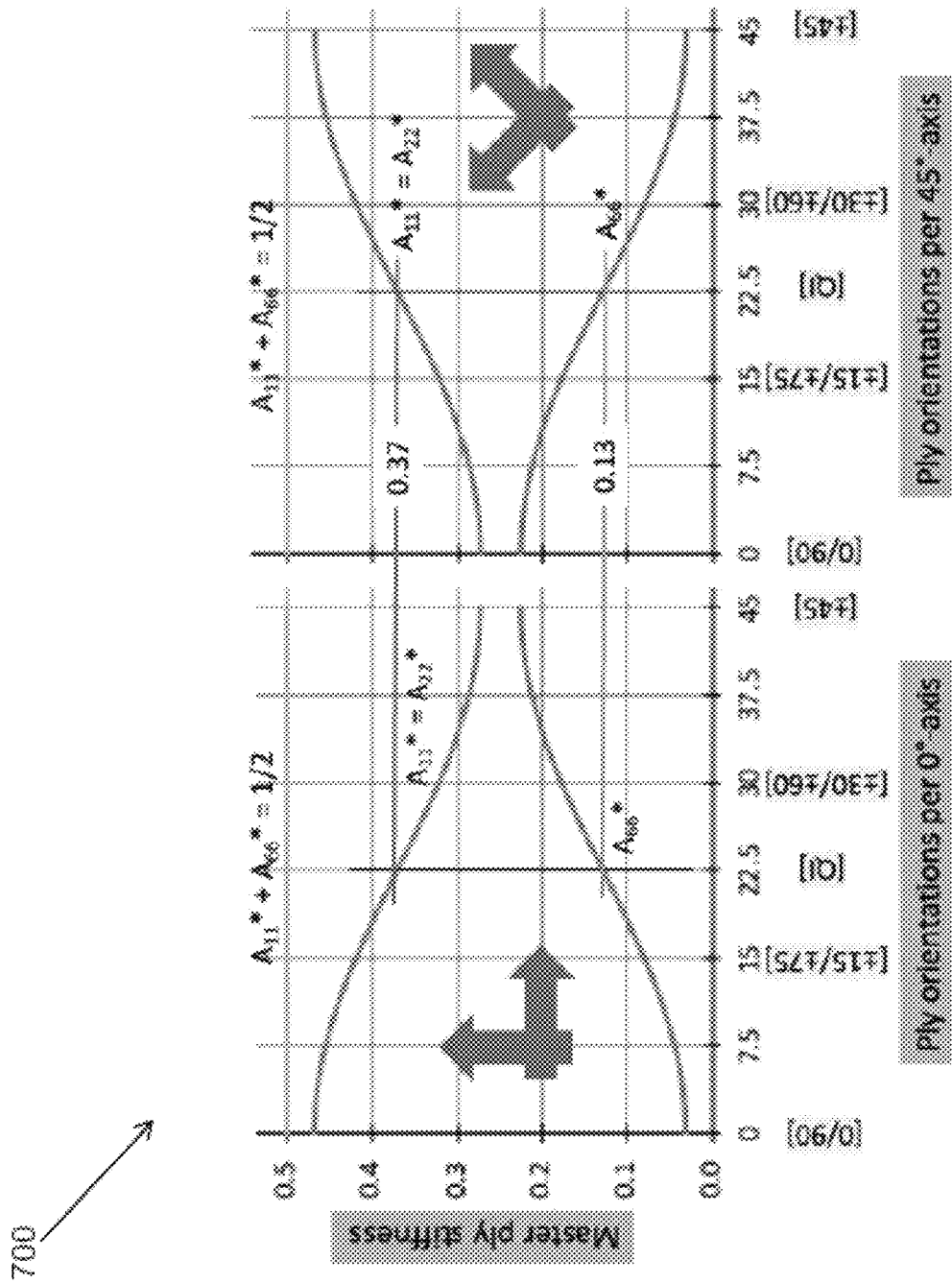
FIG. 8B illustrates stiffness values of square symmetric laminates in both the original (0 degree) and rotated (45 degree) orientation axes according to various embodiments.

Turning now to FIGS. 8A-B, as has been previously described herein, various embodiments of square symmetric double-double laminate structures (and sub-modules thereof) are unique in that their two normal stiffness components $A_{11}$ and $A_{22}$ (see e.g., tables of FIGS. 4-6, as described previously herein as well) are equal, while the shear component remains independent. This may be contrasted, on the one hand, with conventional quasi-isotropic laminates having a dependent shear component and, on the other hand, with orthotropic laminates having four independent components, namely $A_{11}$, $A_{22}$, $A_{12}$ and $A_{66}$.

Square symmetric double-double laminates according to various embodiments are the laminate being both square symmetric and double-double in construction, with the sub-layup of [±Φ/±(π/2−Φ)] or one of the staggered sequences (also described previously herein) for different permutations with comparable resulting structural and material characteristics. Shear coupling is zero for square symmetric double-double laminate orientations; stiffness and manufacturing features are thus available in two reference coordinate systems, one being 45-degrees apart from the other. Such advantages for stiffness, strength, and layup are realized only via the square symmetric double-double laminate constructions according to the embodiments described herein. Of note, the vanishing shear coupling is not only at 0 and 90-degree orientations, but also the rotated 45-degree orientation; understood with reference to their transformation properties illustrated below:

Given $A_{11} =$ $$U_1 + U_2\cos2\theta + U_3\cos4\theta dA_{11}/d\theta = -4[(1/2)(U_2\sin2\theta + U_3\sin4\theta)] = -4A_{61}$$

Also $A_{22} =$ $$U_1 - U_2\cos2\theta + U_3\cos4\theta dA_{22}/d\theta = 4[(1/2)(U_2\sin2\theta - U_3\sin4\theta)] = 4A_{62}$$

When $dA_{11}/d\theta = 0$, $A_{61} = 0$; $dA_{22}/d\theta = 0$, $A_{62} = 0$

Referencing FIG. 8A particularly, the upper left chart 601 thereof shows the sum of $A_{11}$, plus $A_{66}$ twice, and $A_{22}$ as a function of θ, varying from 0 to 90 degrees. In the background, $U_1$* and $U_5$* are also evident (see e.g., by way of comparison, chart 602). Shear coupling $A_{61}$ and $A_{62}$ are zero only when the tangents to the stiffness components $A_{11}$ and $A_{22}$ are horizontal, as shown in the condition above when $dA_{11}/d\theta=0$, and so forth. For [0] ply, this happens only when the transformed angles are 0 or 90. In between, there curves are monotonic and have no maxima or minima.

The upper middle chart 602 shows the quasi-isotropic laminate, wherein all stiffness components are horizontal lines. Thus, shear coupling is zero for the entire range of angles from 0 to 90; this phenomenon according to various embodiments is also evident in that $A_{11}$*=$A_{22}$*=$U_1$*, and $A_{66}$*=$U_5$*. One of the simplest square symmetric laminates according to various embodiments (and as detailed previously herein) is [0°/90°], shown in the upper right chart 603 of FIG. 8A. Transformed components of this laminate have zero shear coupling at not only 0 and 90 degrees, but also at +45 and −45 degrees. The case of +45 degree is shown with red-rimmed circles 604 in chart 603. As stated earlier, if the transformed angles are shifted 45 degrees, this cross-ply laminate will be [±45°], which with [0°/90°] form the two extreme configurations of square symmetric laminates, according to the various embodiments described herein.

In the lower left chart 605 of FIG. 8A, a cross-ply in [0°$_2$/90°] is shown. Of note, positions of the red-rimmed circles 606 indicate where shear coupling would be zero. This laminate, however, is not square symmetric because shear coupling vanishes at different angles between $A_{61}$ and $A_{62}$. This may be compared with the next two charts 610 and 615 in the lower row, wherein two distinct square symmetric double-double laminates according to various embodiments are shown. The middle SS-DD laminate is [±15°/±75°], while the right SS-DD laminate is [±32°/±58°]. Both are square symmetric double-double as seen in having the red-rimmed circles (612 and 617, respectively) at a 45-degree angle. Also of note, the sum of the angles is π/2; i.e., 15°+75°=32°+58°=90°=π/2, further evidencing the square symmetric nature of these embodiments. In these and other embodiments, the angular summation to π/2 is a necessary condition of a laminate to be square symmetric, as has been described previously herein. These characteristics, along with an alternative illustration of stiffness variations with vanishing shear coupling for square symmetric double-double laminates may be further understood from chart 700 of FIG. 8B.

Figure 11C:
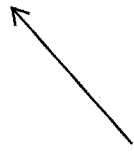

Turning now to FIGS. 11A-11C, buckling characteristics of a square symmetric laminate (and sub-modules thereof) may be understood. Three loading (for buckling testing) cases are shown in the tables 1000, 1010, and 1020 of FIGS. 11A-11C, respectively. For each, in the left column, the laminate or plate orientation is 0-degrees; in the right column, a 45-degree rotation has been imposed. The optimally performing (i.e., with the least buckling; notated by the highest value (e.g., 11.47 in table 1000) square symmetric laminate is [±45°]. This is true for all three loading cases (see also 5.737 value in table 1010; 11.3 value in table 1020). For the rotated 45-degree configurations (right columns), the best performing square symmetric laminates are either [0°/90°] or [90°/0°]; i.e., the same laminate, only reversed mirror images of one another.

Generally, with continued reference to FIGS. 11A-C, bounds of each loading case are: 6.9 to 11.5 for uniaxial compression (shown in table 1000 of FIG. 11A); 3.4 to 5.7 for biaxial compression (shown in table 1010 of FIG. 11B); and 7.0 to 11.3 for simple shear (shown in table 1020 of FIG. 11C). Of course, for practical applications such as those detailed hereinbelow, the "best" laminate may have to consider simultaneously not only compression, shear, and buckling, but also strength, producibility (ease), and the like. Thus, while optimization for buckling is evident in FIGS. 11A-11C, for any specific application, a less than optimized square symmetric laminate may ultimately be chosen/selected.

Figure 12A:
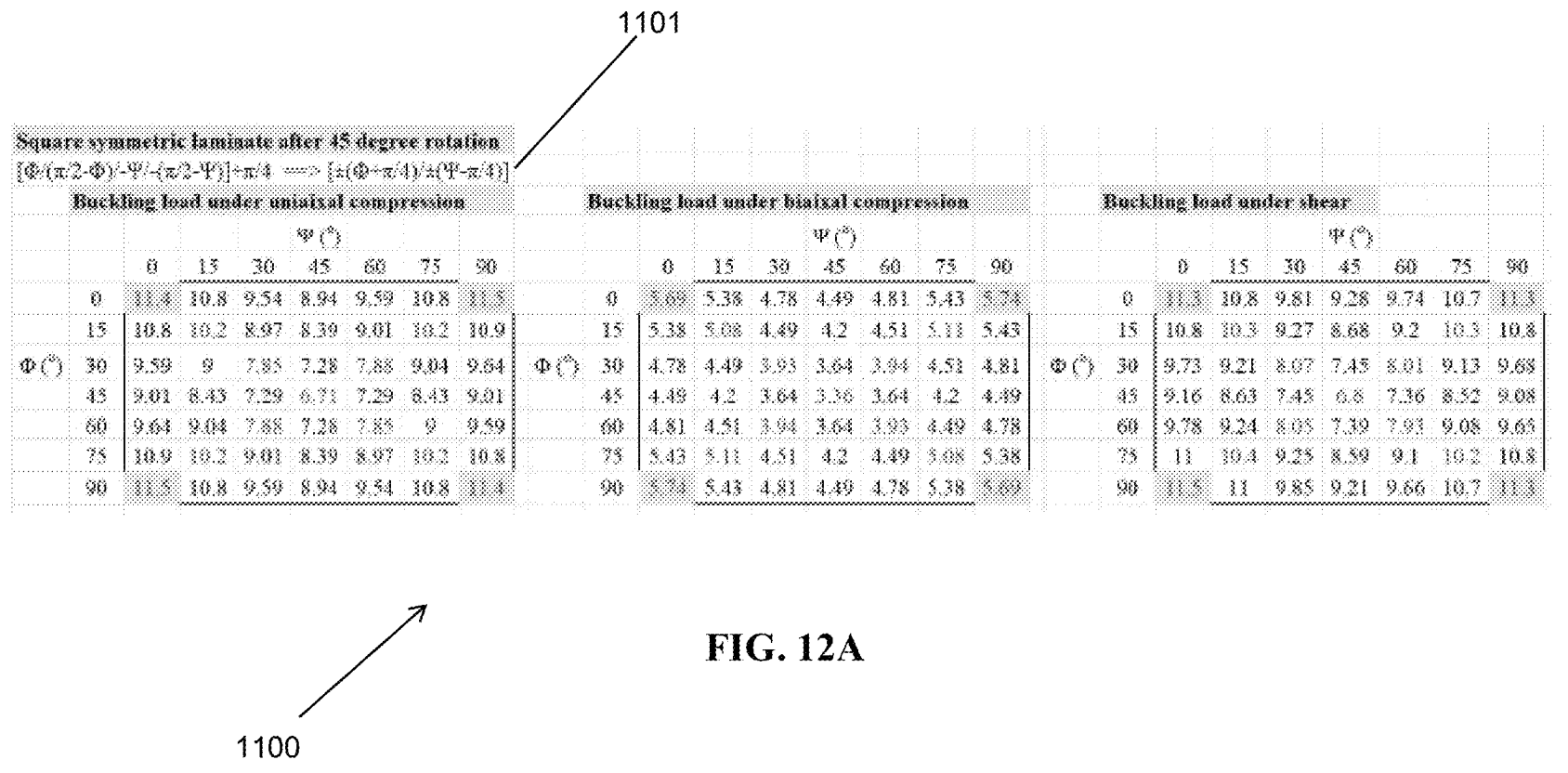
Figure 12B:
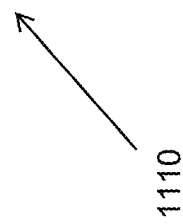
FIG. 12B illustrates conjugate pairs of square symmetric laminates under 45-degree rotation thereof.
Figure 12C:
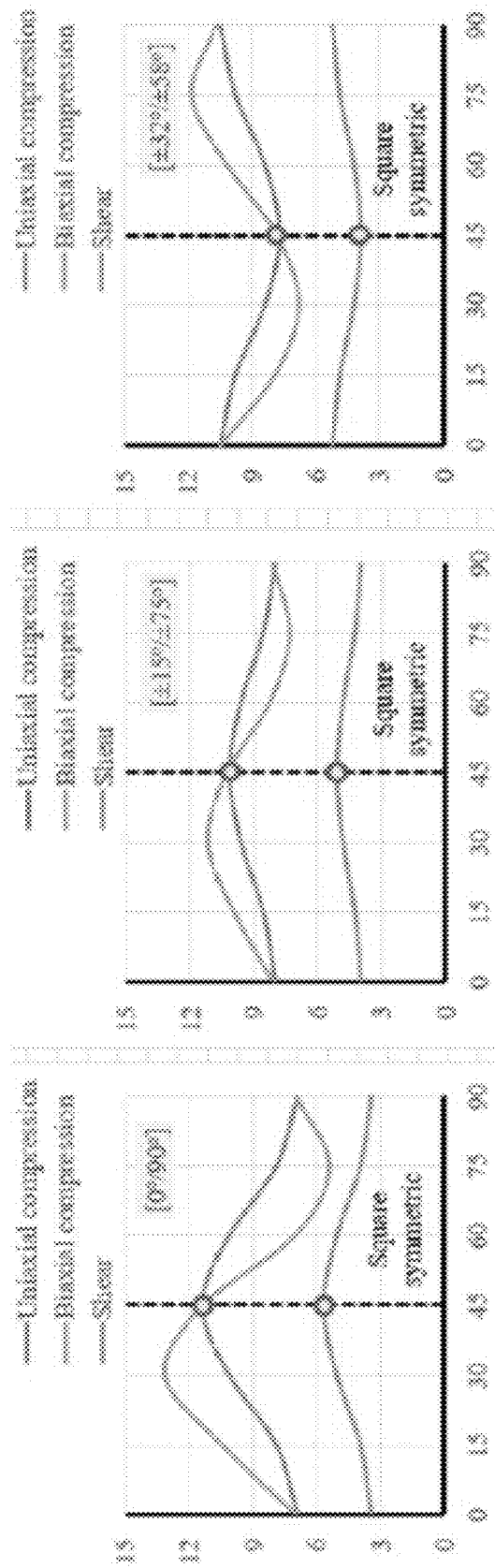
FIG. 12C illustrates additional buckling of square symmetric double-double laminates with uniaxial compression, biaxial compression, and simple shear according to various embodiments.

Turning now to FIG. 12A, shown in the tables 1100 thereof are buckling load under uniaxial and biaxial compression, along with shear force, with respect to a square symmetric laminate post-45-degree rotation and the specific layup 1101 annotated. Conjugate pair laminates are shown in table 1110 of FIG. 12B, with square symmetric double-double optimizations illustrated in red and the preferred laminate (i.e., that with the largest buckling load) highlighted in yellow background. It may thus be understood that, according to various embodiments, the sub-layup of [±45°]$_2$ and its staggered forms alike for different permutations yield the largest buckling load in the whole field of double-double laminates. A further representative of these observations appears in tables 1120 of FIG. 12C, with data once more for uniaxial compression, biaxial compression, and shear compression. Beyond [0°/90°], performance values are also illustrated for embodiments [±15°/±75°] and [±32°/±58°], for purposes of comparison. As noted previously, the configurations at [0°/90°], [90°/0°], and/or [±45°] perform optimally with respect to square symmetric double-double laminates.

Exemplary Applications and Advantages Realized

While throughout herein focus has been on exemplary applications for propellors or blades (e.g., on drones or wind turbines or the like), it should be understood that the various square symmetric double-double laminate structures described have additional or alternative uses, including for pressure vessels, wings, fuselages, cylinders, rockets, drones, wind turbine components, and air and space craft generally.

Most common light-weight structures are made of one skin attached to a sub-structure of spars and ribs. Conventional practice, as described elsewhere herein, requires bolted connections between skin and sub-structures for composites, as common with metal constructions. Composite grid structures with a [0] rib along the fiber direction, however, are approximately four times more efficient in specific stiffness than the same grid made of aluminum or other metal. Coupled with double-double skin (particularly square-symmetric double-double (SS-DD) as described herein can thus provide unmatched specific stiffness, strength, and toughness, even without bolted connections.

Of course, challenges remain in the composite grid space, including matching of height of joints and ribs by using either discontinuous inserts or enlarged volume around the joints for flattening thereof. Use of hybrid ribs that begin with glass at a rib/skin interface and transition to all carbon (or other material) at the height of the ribs is also advantageous; a compressive radial stress will exist at the root because of variations in thermal expansion coefficients. Specifically designed hybrid structures and/or transitions between multiple materials in a single structure may provide desired prestress so that any interfaces are subjected only to radial compressive stress, even during use.

Beyond grid/skin applications, various embodiments of the square symmetric double-double constructions described herein may be utilized in air and/or space-based vehicles, ground-based vehicles, sporting goods, environmental structures (e.g., wind turbines or the like), and more. With the specific square symmetric material characteristics, expanded and simplified options are provided in layup (i.e., manufacturing) processes, while resulting in comparable or improved products, achieved with lower cost and material. Indeed, although first ply strength between conventional double-double laminates and square symmetric constructions (see FIG. 7) may be comparable, their stiffness components are different (see FIGS. 6 and 8A-10) are different. Resulting deflection, buckling, and natural vibration characteristics (see FIGS. 11A-12C) are thus also different, potentially advantageously so in certain applications.

Still further, exemplary and non-limiting advantages of various embodiments of the staggered stacking sequences described herein thus include, as mere non-limiting examples, at least the following:

One exemplary yet important advantage realized in square symmetric double-double laminate structures (including sub-modules thereof) is their uniqueness of having two normal stiffness components equal relative to one another, while the shear component remains independent thereof. This may be contrasted with conventional or quasi-isotropic laminate structures where the shear component is not an independent variable and orthotropic laminate structures with four independent component variables. Improved stiffness and manufacturing features are thus achieved via the square symmetric laminate structures described herein, wherein, as an example, shear coupling is zero in both orientations relative to a two-reference coordinate system. This is not achievable with other orthotropic laminate structures, as conventional in the industry.

Another exemplary advantage realized in square symmetric double-double laminate structures (including sub-modules thereof) is the stock or material required for manufacturers thereof. Specifically, only one angle-ply is required. Stated otherwise, square symmetric laminate structures are simply the cross-plied layups of a single angle-ply fabric. Thus, a manufacturer only needs to stock, by way of non-limiting example, stock [±30] angle-ply fabric, from which this alone a square symmetric laminate can be constructed as [±30/±60], with the [±60] layers being that originally at [±30] and rotated 90 degrees (i.e., cross-plied).

Yet another exemplary advantage realized in square symmetric double-double laminate structures (including sub-modules thereof) is that their thermal expansion coefficients remain constant for the entire family. Stated otherwise, there is only one thermal expansion, where alpha/x=alpha/y. Thus, if a desired structure is made of several square symmetric laminates, no thermal stress will exist amongst each of the respective square symmetric laminates (or sub-modules) forming the same; this is due to the equality of the thermal expansion coefficients. Such constructed laminates behave characteristically as if they are a single/same material. For spacecraft applications, where temperatures can vary widely, having equalized thermal expansion coefficients in this regard is oftentimes critical for the avoidance of thermal stress. This advantage is not realized for non-square symmetric versions of double-double laminate structures.

Figure 9:
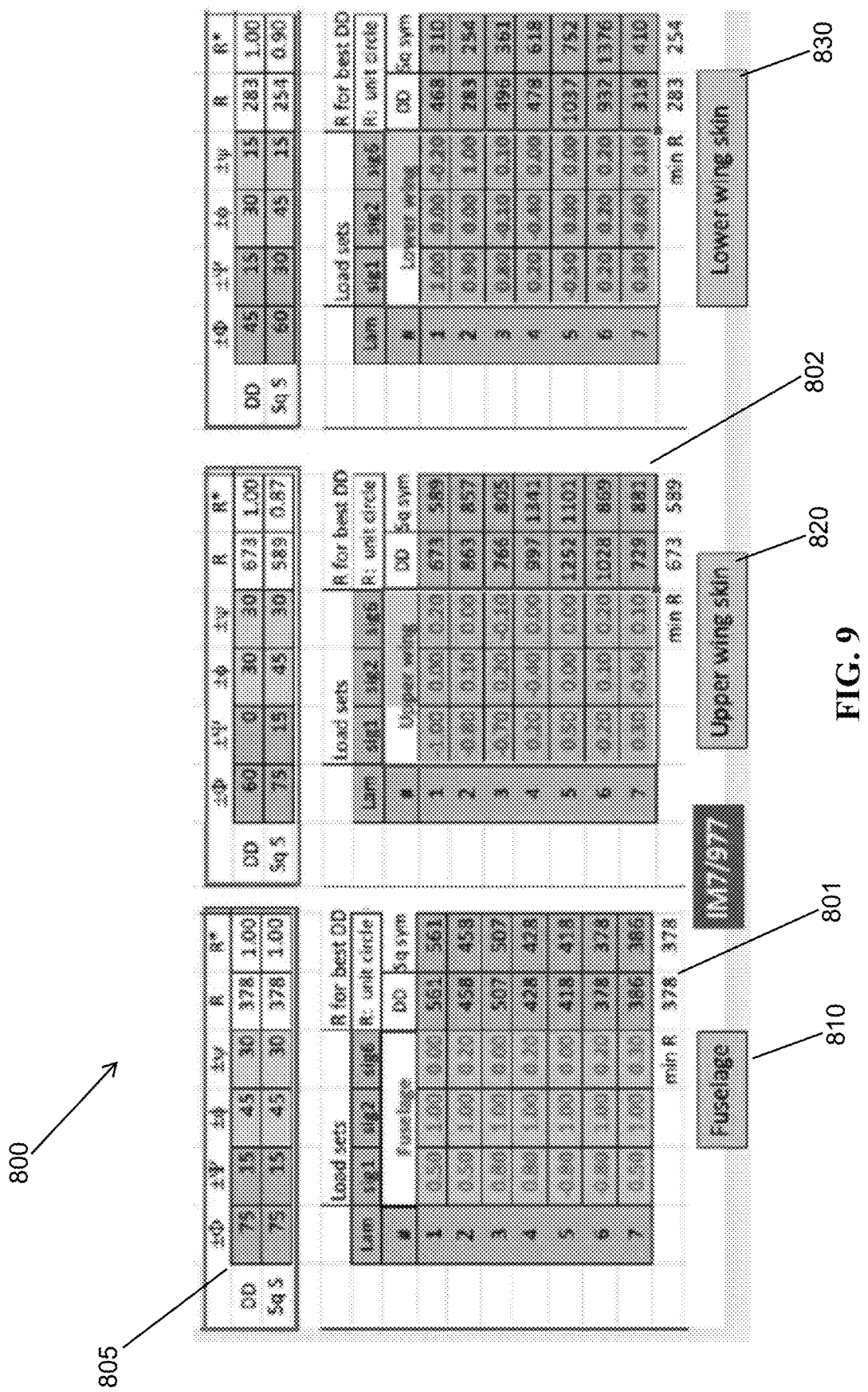
FIGS. 9-10 illustrate exemplary double-double sub-laminate and square symmetric subsets thereof according to various embodiments, highlighted for specific exemplary applications.
Figure 10:
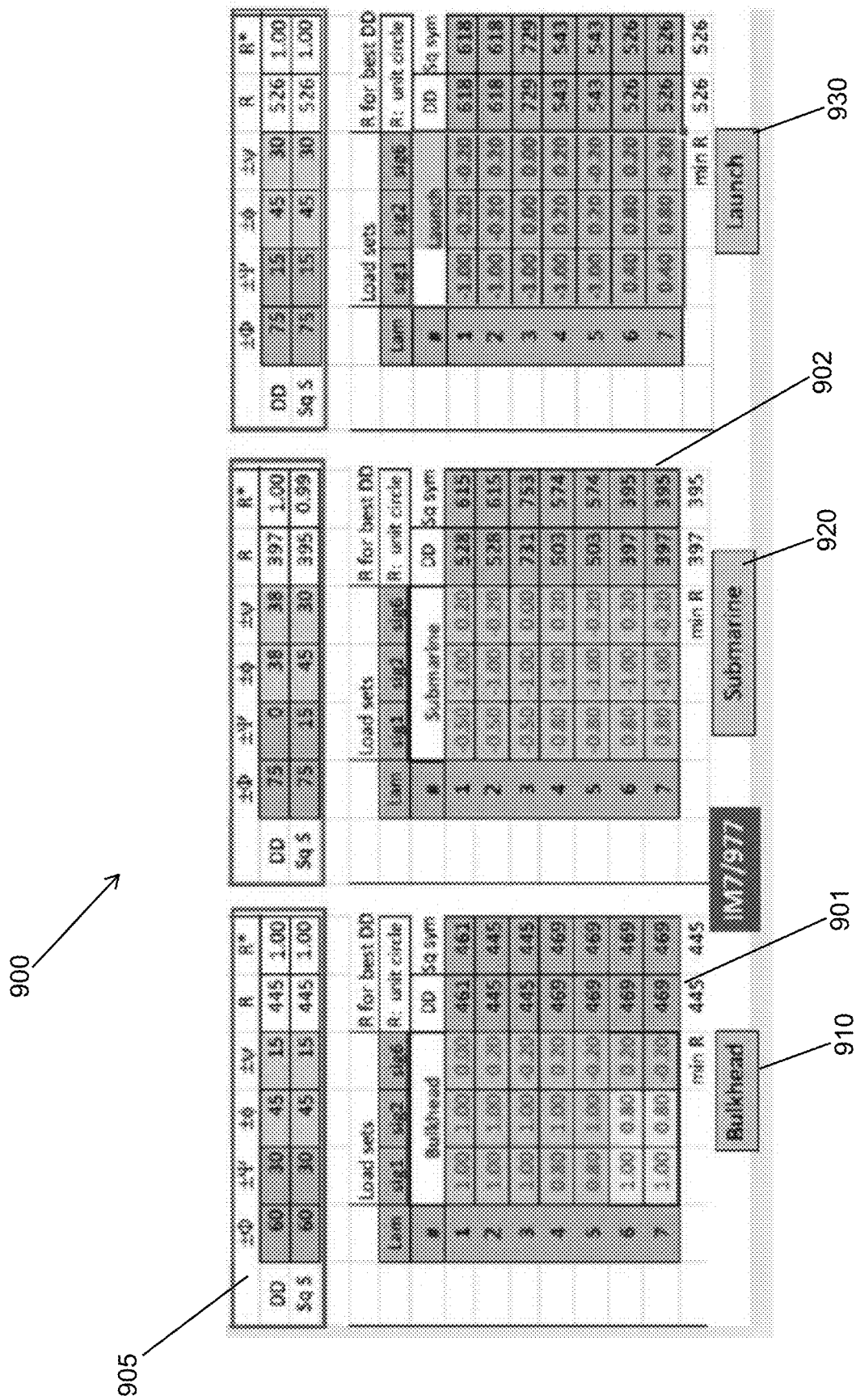

Referencing back to FIG. 7, an exemplary selection tool was described and illustrated, for comparison of optimized material characteristics for a square symmetric double-double laminate (and sub-modules thereof) (versus non-square symmetric double-double constructions). Similarly, FIGS. 9-10 illustrate comparisons between DD (DD1-DD3, as defined previously herein) and square symmetric laminates, broken apart for different possible applications, including for fuselages 810, upper wing skins 820, lower wing skins 830, bulkheads 910, submarines 920, and launch 930 (i.e., rocket) vehicles. These examples are, of course, merely that and not exhaustive.

For each, referencing charts 800 and 900 of FIGS. 9-10, respectively, in the portion seven load sets for each application are listed, with respective strength ratios R, based on unit circle failure criterion, shown in green-background columns. The lowest or minimum value of R is, according to various embodiments, the controlling load among the seven load sets. The first column 801/901 is for DD, and the next column 802/902 for square symmetric.

In the top row 805/905 of each table in FIGS. 9-10, the ply angles for DD1 and DD2 are shown, same with square symmetric laminates. Their respective R-values are repeated, and also listed is the ratio between R for square symmetric divided by that for DD. It is thus evident, according to various embodiments, that the strength difference between DD and square symmetric laminates is small. The largest difference is 13 percent (1.00-0.87) for the upper wing skin 820. For the lower wing skin 830, the difference is 10 percent (1.00-0.90), and for fuselage 910 and submarine 920 there is a difference of approximately one percent or less. For fuselage 810, there is no difference because the best laminate is square symmetric. Also evident in FIGS. 9-10, as previously described herein, three options exist for square symmetric laminate layups when selected, for example, as [±75°/±15°]; these are specifically layups in pairs of [±75°/±15°], as [75°/−15°/−75°/15°]; as [75°/−15°/15°/−75°]; or as [75°/15°/−75°/−15°].

Referencing FIGS. 9-10 further, as mentioned options for layup with respective ply angles are shown in rows 805/905 thereof. The first two angles are for ±Φ and ±Ψ. The next two angles are DD2 for ±Φ and ±Ψ, where one angle-ply is for the single-double tape/fabric, and the other angle is for layup pattern in helical angles. These angles are represented by $[\pm\Phi]_{[\pm\Psi]}$ or its reciprocal $[\pm\Psi]_{[\pm\Phi]}$, all as these nomenclatures have been defined and described previously herein. The illustrations of FIG. 9-10 provide discrete examples for applications related to, as non-limiting examples, fuselages 810, upper wing skins 820, lower wing skins 830, bulkheads 910, submarines 920, and launch 930 (i.e., rocket) vehicles. Further examples in this regard are described, in further detail, previously herein.

CONCLUSION

Of course, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A sub-laminate module comprising:
   a first ply set consisting of a first ply layer oriented at a first angle and a second ply layer oriented at a second angle, a first sum of the first and second angles being ninety degrees; and
   a second ply set consisting of a third ply layer oriented at a third angle and a fourth ply layer oriented at a fourth angle, a second sum of the third and fourth angles being ninety degrees;
   wherein the second ply layer is positioned adjacent the third ply layer and the second and third ply layers are both positioned intermediate the first and fourth ply layers, thereby defining a double-double helix arrangement of the respective ply layers.

2. The sub-laminate module of claim 1, wherein the first and second angles are different than the third and fourth angles, respectively.

3. The sub-laminate module of claim 1, wherein in-plane shear coupling is zero.

4. The sub-laminate module of claim 1, wherein the first ply set has a layup of [Φ/(π/2−Φ)] and the second ply set has a layup of [−Ψ/−(π/2−Ψ)].

5. The sub-laminate module of claim 4, wherein [Φ+Ψ]=90° and Φ≠Ψ.

6. The sub-laminate module of claim 5, wherein either Φ=0° and Ψ=90° or Φ=90° and Ψ=0°.

7. The sub-laminate module of claim 5, wherein Φ lies in a range of 60°-75° and Ψ lies in a range of 15°-30°.

8. The sub-laminate module of claim 5, wherein the layup is either [±30/±60] or [±60/±30].

9. The sub-laminate module of claim 5, wherein the layup is either [±15/±75] or [±75/±15].

10. The sub-laminate module of claim 4, wherein Φ=Ψ.

11. The sub-laminate module of claim 10, wherein Φ and Ψ=45°.

12. The sub-laminate module of claim 11, wherein in-plane shear coupling is zero.

13. The sub-laminate module of claim 1, wherein the first ply set has a layup of [Φ/(π/2−Φ)]+π/4 and the second ply set has a layup of [−Ψ/−(π/2−Ψ)]+π/4.

14. The sub-laminate module of claim 13, wherein either: [Φ+Ψ]=90° and Φ≠Ψ; or Φ=Ψ.

15. A composite laminate structure comprising:
    two or more sub-laminate modules of claim 1,
    wherein:

in each of the two or more sub-laminate modules the first and second angles are different than the third and fourth angles, respectively; and the first, second, third, and fourth angles are each different across the two or more sub-laminate modules.

16. The composite structure of claim 15, wherein:

a first of the two or more sub-laminate modules the first ply set has a layup of $[\Phi/(\pi/2-\Phi)]$ and the second ply set has a layup of $[-\Psi/-(\pi/2-\Psi)]$; and a second of the two or more sub-laminate modules the first ply set has a layup of $[\Phi/(\pi/2-\Phi)]+\pi/4$ and the second ply set has a layup of $[-\Psi/-(\pi/2-\Psi)]+\pi/4$.

17. The composite structure of claim 16, wherein the first sub-laminate module layup is $[\pm30/\pm60]$ and the second sub-laminate module layup is $[\pm75/\pm105]$.

18. The composite structure of claim 15, wherein thermal expansion coefficients of the two or more sub-laminate modules are equalized.

19. A wing skin comprising the composite structure of claim 15.

20. A method of forming a square symmetric composite laminate structure, the method comprising the steps of:

forming a first ply layer by dispensing a first set of first elongate tapes oriented in a first direction and a second set of second elongate tapes oriented in a second direction, a first sum of the first and second directions being 90 degrees, and forming a second ply layer by dispensing a third set of first elongate tapes oriented in a third direction and a fourth set of second elongate tapes oriented in a fourth direction, a second sum of the third and fourth directions being 90 degrees, wherein:

the first and second directions are different than the third and fourth directions, respectively;

the first ply layer has a layup of $[\Phi/(\pi/2-\Phi)]$ and the second ply layer has a layup of $[-\Psi/-(\pi/2-\Psi)]$; and the second elongate tape is positioned adjacent the third elongate tape and the second and third elongate tapes are both positioned intermediate the first and fourth elongate tapes, thereby defining a double-double helix arrangement of the respective elongate tapes forming the first and second ply layers.

* * * * *